(12) United States Patent
Vanneste et al.

(10) Patent No.: US 12,625,063 B2
(45) Date of Patent: May 12, 2026

(54) OPTICAL CONCENTRATE MONITORING FOR MEMBRANE SCALING MITIGATION

(71) Applicant: COLORADO SCHOOL OF MINES, Golden, CO (US)

(72) Inventors: Johan Vanneste, Golden, CO (US); Alexander Schwiebert, Golden, CO (US); John Arthur Bush, Lakewood, CO (US)

(73) Assignee: Colorado School of Mines, Golden, CO (US)

( * ) Notice: Subject to any disclaimer, the term of this patent is extended or adjusted under 35 U.S.C. 154(b) by 371 days.

(21) Appl. No.: 18/180,045

(22) Filed: Mar. 7, 2023

(65) Prior Publication Data

US 2023/0280266 A1 Sep. 7, 2023

Related U.S. Application Data

(60) Provisional application No. 63/268,975, filed on Mar. 7, 2022.

(51) Int. Cl.

| | |
|---|---|
| G01N 21/01 | (2006.01) |
| B01D 61/02 | (2006.01) |
| B01D 61/12 | (2006.01) |
| B01D 65/08 | (2006.01) |
| G01N 21/53 | (2006.01) |

(52) U.S. Cl.
CPC ........... G01N 21/01 (2013.01); B01D 61/025 (2013.01); B01D 61/12 (2013.01); B01D
65/08 (2013.01); G01N 21/532 (2013.01); G01N 2021/0106 (2013.01)

(58) Field of Classification Search
None
See application file for complete search history.

(56) References Cited

U.S. PATENT DOCUMENTS

| | | | | |
|---|---|---|---|---|
| 5,076,931 A * | 12/1991 | Muller | .................... | B01D 61/22 |
| | | | | 210/321.65 |
| 10,507,432 B2 * | 12/2019 | Liberman | ................ | C02F 1/441 |
| 11,713,259 B2 * | 8/2023 | Amaral | .................. | B01D 61/58 |
| | | | | 210/636 |
| 2009/0045144 A1 * | 2/2009 | Cohen | ...................... | C02F 1/441 |
| | | | | 210/745 |
| 2014/0076807 A1 * | 3/2014 | Chidambaran | ........... | C02F 1/48 |
| | | | | 210/636 |
| 2014/0264077 A1 * | 9/2014 | Tokhtuev | ................ | G01N 21/49 |
| | | | | 250/226 |
| 2019/0270655 A1 * | 9/2019 | Jorden | ....................... | C02F 1/56 |

* cited by examiner

*Primary Examiner* — Mark A Shabman
(74) *Attorney, Agent, or Firm* — Dorsey & Whitney LLP

(57) ABSTRACT

Methods and systems are described herein for early detection of scaling during processing of liquid solutions. Particularly, the methods and systems described herein provide detection of the onset of scalant crystallization, so that measures can be deployed in a way that avoids significant scaling of membranes or other separating elements.

15 Claims, 18 Drawing Sheets
(15 of 18 Drawing Sheet(s) Filed in Color)

OPTICAL CONCENTRATE MONITORING FOR MEMBRANE SCALING MITIGATION

CROSS-REFERENCE TO RELATED APPLICATIONS

This application claims priority to U.S. Provisional Patent Application No. 63/268,975, entitled "OPTICAL CONCENTRATE MONITORING ALGORITHM FOR MEMBRANE SCALING MITIGATION", filed on Mar. 7, 2022, the contents of which are hereby incorporated herein in their entirety.

GOVERNMENT RIGHTS

This invention was made with Government support under Agreement Number R19AC00096 awarded by the United States Bureau of Reclamation. The Government has certain rights in the invention.

BACKGROUND

Water scarcity is a global problem, with several technologies and approaches being applied to solve it. Desalination has emerged in recent decades as a promising technology to compensate for the freshwater shortage. The first modern thermal desalination processes included multi-stage flash (MSF) and multi-effect distillation (MED). With the subsequent development of the modern reverse osmosis (RO) process, membrane desalination became an economic alternative to thermal desalination. However, scaling is a severe problem for membrane desalination, leading to lower water recovery. Scaling is also a problem in other processes that lead to concentration of scalants.

SUMMARY

Disclosed herein are methods and systems for mitigating scaling during separation processes through early detection of scaling. In some embodiments, the disclosed methods of detecting scaling can comprise providing a separation system that includes a separation module, where said separation module comprises a separating element that separates one or more solutes from a liquid solution and concentrates the one or more solutes into a concentrate stream; and an optical turbidity monitor having an optical signal source and at least one optical sensor; supplying a feed stream of the liquid solution to the separation module at a pressure and a flow rate; measuring turbidity of the concentrate stream using the optical turbidity monitor to determine a turbidity value of the concentrate stream; calculating a first derivative of the turbidity value with respect to time to generate a turbidity derivative; determining a setpoint that corresponds to a concentration of a scalant mineral in the feed stream below which scaling of the separating element by the scalant mineral does not occur; comparing the turbidity derivative to the setpoint; and performing a preventative measure to avoid further scaling by the scalant mineral if the turbidity derivative equals or exceeds the setpoint. In some embodiments, the method may comprise applying signal conditioning to reduce noise in the turbidity value, and the signal conditioning may comprise applying a low pass frequency filter to the turbidity value or filtering using a coherence function between two or more turbidity signals produced by the optical turbidity monitor, and the determining the setpoint may optionally comprise calculating a signal-to-noise ratio (SNR) of the turbidity derivative and/or the setpoint may be determined to be a multiple of the SNR, and wherein the multiple may be about 3 to about 10, or about 4 to about 6. In some embodiments, the calculating the SNR may comprises: calculating a moving average of the turbidity derivative over a time interval, wherein the time interval may be about 10 seconds to about 1000 seconds; calculating a standard deviation of the turbidity derivative over the time interval; and calculating the SNR uses Equation 1, optionally after a time delay from commencement of the measuring step, wherein the time delay may be about 1 minute to about 10 minutes, or calculating the SNR may be performed after completion of a percentage of liquid recovery, wherein the percentage may be about 5% to about 50%. In many embodiments, the scalant mineral may be selected from carbonates, sulfates, silicates, phosphates and nitrates, for example gypsum, calcium carbonate, silica, calcium phosphate, strontium sulfate, barium sulfate, and ammonium nitrate and/or the optical signal source may generate light at a wavelength of about 250 nm to about 10000 nm, about 250 nm to about 1400 nm, about 350 nm to about 1000, about 350 nm to about 500 nm, or about 800 nm to about 1000 nm, and optionally positioned at an angle of about 0° to about 90° relative to a path of light emitted from the optical signal source, wherein the optical turbidity monitor optionally includes: an optical sensor positioned at an angle of about 0° relative to the path of light emitted from the optical signal source and configured to produce a transmittance measurement; and at least one optical sensor positioned at about 10° to about 90° relative to the path of light emitted from the optical signal source and configured to produce a scattering measurement, wherein the turbidity value may be a ratio of the scattering measurement to the transmittance measurement, and further optionally, the angle of the at least one optical sensor configured to produce the scattering measurement may be about 11° or about 90°. In some embodiments, an optical path length in the optical turbidity monitor may be about 10 mm to about 300 mm, and the separating element may comprise a membrane configured for forward osmosis, reverse osmosis, microfiltration, nanofiltration, ultrafiltration, membrane distillation or electrodialysis, for example the membrane may be a reverse osmosis membrane. In some embodiments, the preventative measure may be selected from decreasing the pressure and increasing the flow rate and/or the method may further comprise: recycling the concentrate stream through the separation module if the turbidity derivative may be below the setpoint; and diverting the concentrate stream away from the separation module if the turbidity derivative equals or exceeds the setpoint, such as wherein recycling comprises combining the concentrate stream and the feed stream, or recycling comprises replacing the feed stream with the concentrate stream, which may be combined with a step of recovering the one or more solutes from the concentrate stream after the diverting step, and optionally supplying the concentrate stream to the separation module, and/or wherein the preventative measure comprises at least one of: flushing with undersaturated solution, osmotic backflushing, flow reversal, chemical cleaning, adding an antiscalant to the feed stream, and adjusting a pH of the feed stream. In some embodiments, the disclosed methods may further comprise identifying the scalant mineral by one or more of: measuring a pressure of the concentrate stream, analyzing the turbidity value of the concentrate stream, and assessing effectiveness of a previously applied preventative measure and/or determining an improved subsequent setpoint based upon iterative results of one or more of: measuring a pressure of the concentrate stream, analyzing the turbidity value of the concentrate stream, and assessing effectiveness of a previously applied preventative measure, wherein the preventative measure comprises at least one of: flushing with undersaturated solution, osmotic backflushing, flow reversal, chemical cleaning, adding an antiscalant to the feed stream, and adjusting a pH of the feed stream.

Also disclosed are systems for processing a liquid solution. In many embodiments, the systems may comprise: at least one separation module comprising: an inlet configured to receive a feed stream comprising a liquid solution; at least one separating element that separates one or more solutes from the feed stream to produce a dilute permeate stream by concentrating the one or more solutes into a concentrate stream; and a concentrate outlet for allowing the concentrate stream to exit the separation module; at least one optical turbidity monitor in fluidic communication with the concentrate outlet and configured to measure a turbidity value of the concentrate stream, said optical turbidity monitor comprising an optical signal source and at least one optical sensor; and a pump for moving the liquid solution within the system at a flow rate and a pressure, and may further comprise a control unit operatively connected to the turbidity monitor, wherein the control unit may be configured to: receive the turbidity value from the at least one optical turbidity monitor; calculate a first derivative of the turbidity value with respect to time to generate a turbidity derivative; determine a setpoint that corresponds to a concentration of a scalant mineral in the feed stream below which scaling of the separating element by the mineral does not occur; and compare the turbidity derivative to the setpoint, and optionally the control unit may be configured to initiate a preventative measure to avoid further scaling by the scalant mineral if the turbidity derivative equals or exceeds the setpoint, and, optionally, the preventative measure may be selected from decreasing the pressure and increasing the flow rate. In some embodiments, the control unit of the system may determine the setpoint by calculating a signal-to-noise ratio (SNR) of the turbidity derivative, and optionally determine the setpoint to be a multiple of the SNR, and wherein the multiple may be about 3 to about 10, or about 4 to about 6. In some embodiments, calculating the SNR may comprise: calculating a moving average of the turbidity derivative over a time interval, wherein the time interval may be about 10 seconds to about 1000 seconds; calculating a standard deviation of the turbidity derivative over the time interval; and calculating the SNR as Equation 1. In some embodiments, the control unit of the system may be configured to calculate the SNR after a time delay from commencement of the measuring step, wherein the time delay may be about 1 minute to about 10 minutes, or after completion of a percentage of liquid recovery, wherein the percentage may be about 5% to about 50%. The disclosed systems may optionally comprise a pressure monitor situated downstream of the concentrate outlet and configured to measure a pressure of the concentrate stream. In some embodiments of the system the optical signal source may generate light at a wavelength of about 250 nm to about 10000 nm, about 250 nm to about 1400 nm, about 350 nm to about 1000, about 350 nm to about 500 nm, or about 800 nm to about 1000 nm, and/or the at least one optical sensor may be positioned at an angle of about 0° to about 90° relative to a path of light emitted from the optical signal source, or the angle may be selected from about 0°, about 11°, and about 90°, and the optical turbidity monitor may comprise: an optical sensor positioned at an angle of about 0° relative to the path of light emitted from the optical signal source and configured to produce a transmittance measurement; and at least one optical sensor positioned at about 10° to about 90° relative to the path of light emitted from the optical signal source and configured to produce a scattering measurement, wherein the turbidity value may be a ratio of the scattering measurement to the transmittance measurement, and optionally the angle of the at least one optical sensor may be configured to produce the scattering measurement may be about 11° or about 90°. In some embodiments, an optical path length in the optical turbidity monitor may be about 10 mm to about 300 mm and/or the at least one optical sensor may be an evanescent wave sensor. In some embodiments, the disclosed system may comprise a valve unit situated downstream of the optical turbidity monitor and configured to alternate between the following modes of operation based upon the turbidity derivative: a concentration mode comprising directing the concentrate stream to the inlet for further concentration by the separating element; and a disposal mode comprising diverting the concentrate stream away from the inlet, and optionally, the control unit may be controllably connected to the valve unit and may be configured to selectively actuate the valve to operate in concentration mode if the turbidity derivative may be below the setpoint, or in disposal mode if the turbidity derivative equals or exceeds the setpoint, and optionally the preventative measure comprises at least one of: flushing with undersaturated solution, osmotic backflushing, flow reversal, chemical cleaning, adding an antiscalant to the feed stream, and adjusting a pH of the feed stream. In some embodiments, the at least one separation module comprises a plurality of separating elements arranged in series, and optionally at least one separating element may comprise a membrane configured for forward osmosis, reverse osmosis, microfiltration, nanofiltration, ultrafiltration, membrane distillation or electrodialysis, for example a reverse osmosis membrane. In some embodiments, the control unit may be configured to determine an improved subsequent setpoint based upon iterative results of one or more of: measuring a pressure of the concentrate stream, analyzing the turbidity value of the concentrate stream, and assessing effectiveness of a previously applied preventative measure, wherein the preventative measure comprises at least one of: flushing with undersaturated solution, osmotic backflushing, flow reversal, chemical cleaning, adding an antiscalant to the feed stream, and adjusting a pH of the feed stream.

Also disclosed are systems and methods for demineralization of water. The disclosed demineralization methods and systems may comprise: a reverse osmosis module comprising: an inlet configured to receive a feed stream of water; a reverse osmosis membrane that separates one or more solutes from the feed stream to produce a dilute permeate stream by concentrating the one or more solutes into a concentrate stream; a concentrate outlet for allowing the concentrate stream to exit the reverse osmosis module; and a permeate outlet for allowing the permeate stream to exit the reverse osmosis module; an optical turbidity monitor in fluidic communication with the concentrate outlet and configured to measure a turbidity value of the concentrate stream, said optical turbidity monitor comprising an optical signal source and at least one optical sensor; a valve unit situated downstream of the optical turbidity monitor and configured to alternate between the following modes of operation based upon the turbidity value: a concentration mode comprising directing the concentrate stream to the inlet for further concentration by the reverse osmosis membrane; and a disposal mode comprising discharging the concentrate stream from the system; a control unit operatively connected to the valve unit and controllably connected to the turbidity monitor, wherein the control unit may be configured to: receive the turbidity value from the optical turbidity monitor; calculate a first derivative of the turbidity value with respect to time to generate a turbidity derivative; determine a setpoint that corresponds to a concentration of a scalant mineral in the feed stream below which scaling of the reverse osmosis membrane by the mineral does not occur; compare the turbidity derivative to the setpoint; and selectively actuate the valve unit to operate in concentration mode if the turbidity derivative may be below the setpoint, or in disposal mode if the turbidity derivative equals or exceeds the setpoint, and optionally the control unit may determine the setpoint by calculating a signal-to-noise ratio (SNR) of the turbidity derivative, and the control unit may determine the setpoint to be a multiple of the SNR, and wherein the multiple may be about 3 to about 10. In some embodiments, calculating the SNR may comprise: calculating a moving average of the turbidity derivative over a time interval, wherein the time interval may be about 10 seconds to about 1000 seconds; calculating a standard deviation of the turbidity derivative over the time interval; and calculating the SNR as Equation 1, and the optical turbidity monitor may comprise: an optical sensor positioned at an angle of about 0° relative to a path of light emitted from the optical signal source; and at least one optical sensor positioned at about 10° to about 90° relative to the path of light emitted from the optical signal source.

Also disclosed are methods of detecting scaling during processing of a liquid solution. These methods may comprise: providing a separation system comprising: at least one separation module comprising a separating element that separates one or more solutes from a liquid solution and concentrates the one or more solutes into a concentrate stream; an optical turbidity monitor comprising an optical signal source and at least one optical sensor; supplying a feed stream of the liquid solution to the at least one separation module; measuring turbidity of the concentrate stream using the optical turbidity monitor to determine a turbidity value of the concentrate stream; calculating a first derivative of the turbidity value with respect to time to generate a turbidity derivative; determining a setpoint that corresponds to a concentration of a scalant mineral in the feed stream below which scaling of the separating element by the scalant mineral does not occur; and comparing the turbidity derivative to the setpoint, and determining the setpoint may comprise calculating a signal-to-noise ratio (SNR) of the turbidity derivative, and/or the setpoint may be determined to be a multiple of the SNR, and wherein the multiple may be about 3 to about 10, or about 4 to about 6, and calculating the SNR may comprise: calculating a moving average of the turbidity derivative over a time interval, wherein the time interval may be about 10 seconds to about 1000 seconds; calculating a standard deviation of the turbidity derivative over the time interval; and calculating the SNR as Equation 1. In some embodiments, the scalant mineral may be selected from carbonates, sulfates, silicates, phosphates and nitrates, for example gypsum, calcium carbonate, silica, calcium phosphate, strontium sulfate, barium sulfate, and ammonium nitrate. The disclosed methods may further comprising identifying the scalant mineral by one or more of: measuring a pressure of the concentrate stream, analyzing the turbidity value of the concentrate stream, and assessing effectiveness of a previously applied preventative measure, wherein the preventative measure comprises at least one of: flushing with undersaturated solution, osmotic backflushing, flow reversal, chemical cleaning, adding an antiscalant to the feed stream, and adjusting a pH of the feed stream. In some embodiments, the methods may comprise determining an improved subsequent setpoint based upon iterative results of one or more of: measuring a pressure of the concentrate stream, analyzing the turbidity value of the concentrate stream, and assessing effectiveness of a previously applied preventative measure, wherein the preventative measure comprises at least one of: flushing with undersaturated solution, osmotic backflushing, flow reversal, chemical cleaning, adding an antiscalant to the feed stream, and adjusting a pH of the feed stream.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
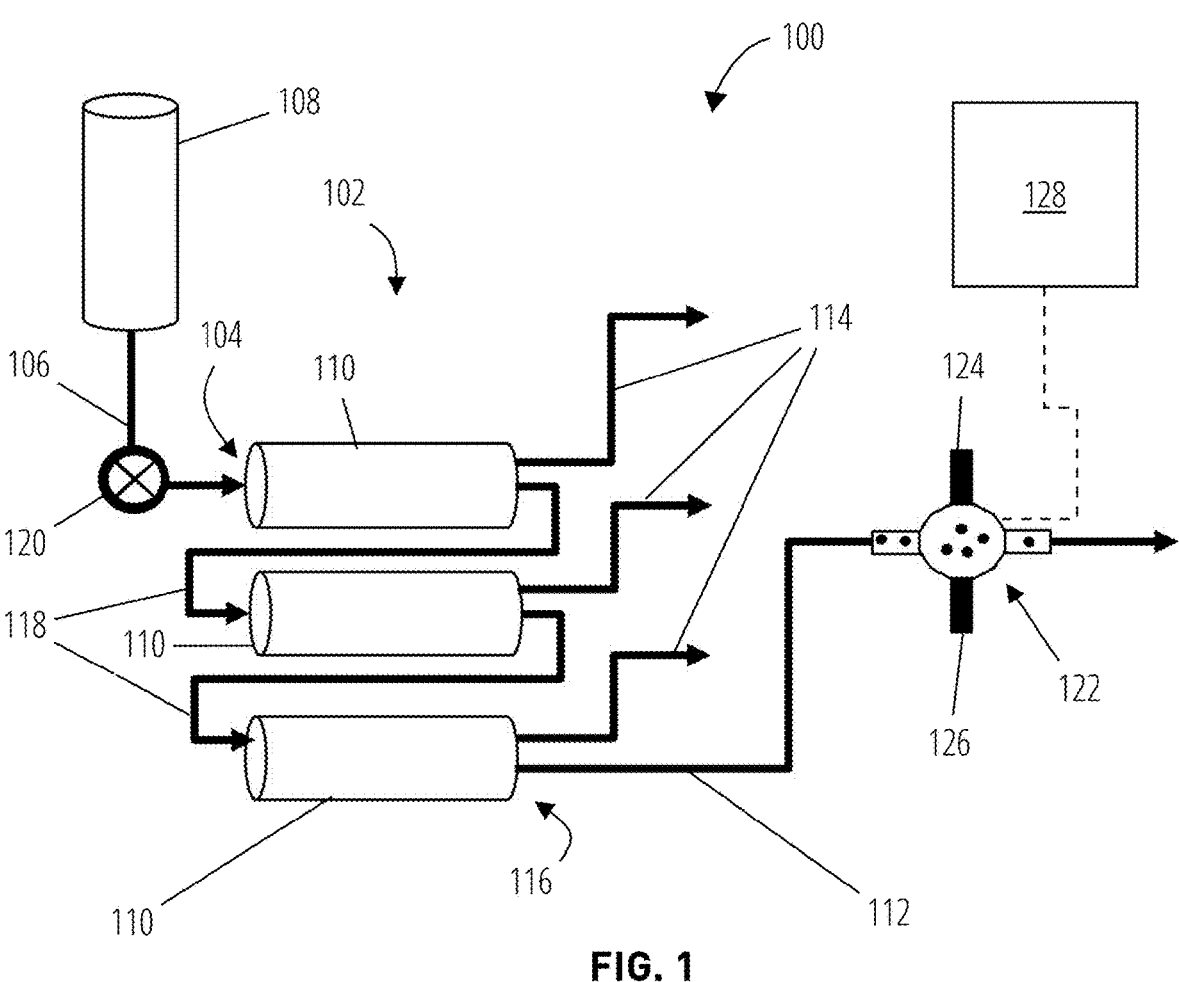
FIG. 1 is a flow diagram of a separation system in accordance with an embodiment.

The present disclosure is related to separation technologies for processing water and other liquids particularly as applied to for removing and/or concentrating solutes or suspended solids in such liquids. The terms "separation method," "separation process" or "separation system" as used herein refer respectively to any method, process or system, that separates one or more solutes from a liquid feed solution to produce at least a stream in which the solutes are less concentrated than in the feed solution (referred to herein as a "permeate stream"); and a stream in which the solutes are more concentrated than in the feed solution (referred to herein as a "concentrate stream" or "reject stream"). Therefore, while the present disclosure may use particular processes such as demineralization or particularly desalination to illustrate the methods and systems described herein, said methods and systems should be understood as applicable to all separation processes as defined above including, but not limited to, membrane processes such as forward osmosis, reverse osmosis, microfiltration, nanofiltration, ultrafiltration, membrane distillation and electrodialysis. Contemplated applications include purifying industrial waters (e.g., cooling towers, boilers), brine management, desalination, food processing, mineral harvesting, chemical and pharmaceutical purification, and solvent extraction.

Membrane-based desalination of water is one particularly illustrative embodiment of the present disclosure exemplifying some of the technical challenges associated with these processes. Conventional reverse osmosis (RO) desalination involves passing the feedwater through a network of RO membranes via cross-flow filtration with the feed stream partially permeating through the membrane through a pressure differential. Brine and permeate leave the network at the end. In this scheme the number of membrane elements in series determines the water recovery, which is the ratio of fresh water produced to the initial volume of untreated water. In a batch-operated closed circuit desalination (CCD) system, the brine does not leave the system immediately; instead the brine is recirculated through the system. In this design, the single pass water recovery is determined by the recirculation flow rate and the total recovery by the cycle time.

Desalination processes produce brine due to the dissolved salts in the initial feed water concentrating in the reject stream. Once the concentration of salts in the reject stream increases above saturation, a crystallization process starts and crystals form homogenously within the system. If left unaddressed, the crystals are deposited and/or form on the membrane leading to a decline in flux or potentially damaging the membrane. In order to protect membranes, desalination facilities use various strategies such as reduced water recovery and the addition of antiscalants. These strategies result in increased brine production and expense, and reduced efficiency and water recovery.

Scaling is a problem encountered by various membrane desalination facilities with calcium sulfate, calcium carbonate, and silica among possible scalants due to their low solubility. Early scaling detection is a potential way to increase efficiency and liquid recovery, protect membranes from scaling and lower overall expense (including costs associated with membrane cleaning or replacement). However, current systems use inefficient processes that include high resolution cameras and image software to analyze a membrane installed on a side stream to detect scaling on the side stream. These systems require implementation of a side stream that operates with real-time image analysis software and high resolution cameras, which increase the cost of operation and detects scaling a posteriori i.e., after it has affected the membrane's performance.

The present disclosure describes methods and systems for early detection of scaling during processing of liquid solutions. Particularly, the methods and systems described herein provide detection of the onset of scalant crystallization, so that measures can be deployed in a way that avoids or significantly reduces scaling of membranes and/or other system components/equipment. The ability to detect onset of scalant crystallization, allows the liquid separation or concentration system and equipment to be operated with fewer interruptions needed for cleaning or replacement of components. The inventors have, surprisingly, found that homogeneous nucleation in separation systems can be detected during operation of such systems by monitoring and analyzing the turbidity of the concentrate stream. With the analysis methods and systems described herein, accurate and actionable detection can be achieved under operational flow and conditions (pressure, temperature, etc.).

As disclosed herein, a method of detecting scaling during processing of a liquid solution can comprise: feeding a stream of the solution to a separation module of a separation system, where the separation module separates one or more solutes from the liquid solution and concentrates them into a concentrate stream; monitoring the turbidity of the concentrate stream through time to produce a turbidity value; comparing the turbidity value or a value derived therefrom to a setpoint that corresponds to the onset of scaling by a solute in the solution. In some embodiments, analysis of the turbidity value can be used to ascertain a setpoint that is based particularly on the characteristics of the solution and the system during actual execution of the process.

Relatedly, a system for processing a liquid solution can comprise at least one separating element that separates one or more solutes from a feed stream of a liquid solution to produce a dilute permeate stream by concentrating the one or more solutes into a concentrate stream. The separating element may be part of a separation module that also includes an inlet for receiving the feed stream and outlets for egress of the product streams. The system may further comprise a turbidity monitor situated for monitoring the concentrate stream and producing a turbidity value thereof. In some embodiments, the turbidity monitor utilizes optical signals to measure turbidity.

The disclosed methods are useful in monitoring and/or preventing scaling in various liquid separation systems. In some embodiments, the disclosed separation system may be selected from desalination, forward osmosis, reverse osmosis, microfiltration, nanofiltration, ultrafiltration, membrane distillation, and electrodialysis, cooling towers, brine management, food processing, mineral harvesting, chemical purification, and solvent extraction. In many embodiments, the system is a RO or desalination system. In some embodiments, the separation device or separation component may be selected from a membrane, filter, evaporative cooler, distillation tank/flask, condenser, etc.

Embodiments may be understood by reference to the drawings, wherein like parts are designated by like numerals throughout. It will be readily understood by one of ordinary skill in the art having the benefit of this disclosure that the components of the embodiments, as generally described and illustrated in the figures herein, could be arranged and designed in a wide variety of different configurations. Thus, the following more detailed description of various embodiments, as represented in the figures, is not intended to limit the scope of the disclosure, but is merely representative of various embodiments. While the various aspects of the embodiments are presented in drawings, the drawings are not necessarily drawn to scale unless specifically indicated.

It will be appreciated that various features are sometimes grouped together in a single embodiment, figure, or description thereof for the purpose of streamlining the disclosure. Many of these features may be used alone and/or in combination with one another.

The phrases "coupled to" and "in communication with" refer to any form of interaction between two or more entities, including mechanical, electrical, magnetic, electro-magnetic, fluid, and thermal interaction. Two components may be coupled to or in communication with each other even though they are not in direct contact with each other. For example, two components may be coupled to or in communication with each other through an intermediate component.

Various aspects of the methods and systems encompassed by the present disclosure may be illustrated by the diagram of a separation system 100 shown in FIG. 1. Such a system can comprise a separation module 102 having an inlet 104 configured to receive a feed stream 106 of a liquid solution having solutes dissolved or suspended therein. The feed stream 106 can be supplied from a source 108 of the liquid solution, such as a storage tank or reservoir. The separation module 102 can comprise a separating element 110 configured to separate one or more of the solutes from the feed stream 106 and to concentrate them into a concentrate stream 112. The remaining liquid from the feed stream 106 is produced as a permeate stream 114 in which the solutes are diluted or substantially absent. As illustrated in FIG. 1, in some embodiments the separation module can comprise a plurality of separating elements 110. The separating elements 110 may be connected in series where an intermediate concentrate stream 118 produced by one separating element 110 is an input stream of the next separating element 110 in the series.

The separating element 110 can be any component or device configured for removing and/or concentrating solutes from liquid including, without limitation, reverse osmosis membranes and forward osmosis membranes. Some separating elements of this type—reverse osmosis membranes, for example—utilize a pressure driven process to move solutes against an osmotic pressure gradient. As such, the separation system 100 can comprise a pump 120 to move liquid through the system at a selected flow rate and to generate sufficient hydraulic pressure within the system as needed to effect separation.

The separation system 100 can further comprise an optical turbidity monitor 122 fluidically connected to the separation module 102. More particularly, optical turbidity monitor 122 can be connected to a concentrate outlet by which the concentrate stream 112 produced by the sole—or in a series, the last—separating element 110 exits the separation module 102. The optical turbidity monitor 122 is situated to measure a turbidity value of the concentrate stream 112.

In some embodiments, the optical turbidity monitor 122 is a pass-through device that utilizes light emitted into the concentrate stream 112 to measure the turbidity value. In certain embodiments, the optical turbidity monitor 122 comprises an optical signal source 124 that generates light at a wavelength of about 250 nm to about 10000 nm. More particularly the wavelength can be about 250 nm to about 1400 nm, about 350 nm to about 1000, about 350 nm to about 500 nm, or about 800 nm to about 1000 nm. For example, the wavelength may be greater than about 250 nm, 300 nm, 350 nm, 400 nm, 450 nm, 500 nm, 550 nm, 600 nm, 650 nm, 700 nm, 750 nm, 800 nm, 850 nm, 900 nm, 950 nm, 1000 nm, 1050 nm, 1150 nm, 1200 nm, 1250 nm, 1300 nm, 1350 nm, or more, and less than about 1500 nm, 1400 nm, 1350 nm, 1300 nm, 1250 nm, 1200 nm, 1150 nm, 1100 nm, 1050 nm, 1000 nm, 950 nm, 900 nm, 850 nm, 800 nm, 750 nm, 700 nm, 650 nm, 600 nm, 550 nm, 500 nm, 450 nm, 400 nm, 350 nm, or 300 nm.

The optical turbidity monitor 122 can comprise at least one optical sensor 126 configured to detect a portion of the emitted light. In some embodiments, one or more optical sensors are each positioned at an angle of about 0° to about 90° relative to a path of light emitted from the optical signal source 124. Particular examples of angles include about 0°, about 11°, and about 90°. In some embodiments, the optical turbidity monitor 122 includes at least one optical sensor positioned at an angle of about 0° relative to the path of light emitted from the optical signal source and configured to produce a transmittance measurement based upon detection of emitted light that passes through the liquid in the concentrate stream. In certain embodiments, the optical turbidity monitor further comprises at least one optical sensor positioned at about 10° to about 90° relative to the path of light emitted from the optical signal source and configured to produce a scattering measurement based upon detection of emitted light reflected by solids in the concentrate stream. For example, in some embodiments, the one or more optical sensor may be positioned, relative to the light emitted from the optical source, at greater than about 0°, 1°, 2°, 3°, 4°, 5°, 6°, 7°, 8°, 9°, 10°, 15°, 20°, 25°, 30°, 35°, 40°, 45°, 50°, 55°, 60°, 65°, 70°, 75°, 80°, or 85°, and less than about 95°, 90°, 85°, 80°, 75°, 70°, 65°, 60°, 55°, 50°, 45°, 40°, 35°, 30°, 25°, 20°, 15°, 10°, 9°, 8°, 7°, 6°, 5°, 4°, 3°, 2°, or 1°.

Figure 2:
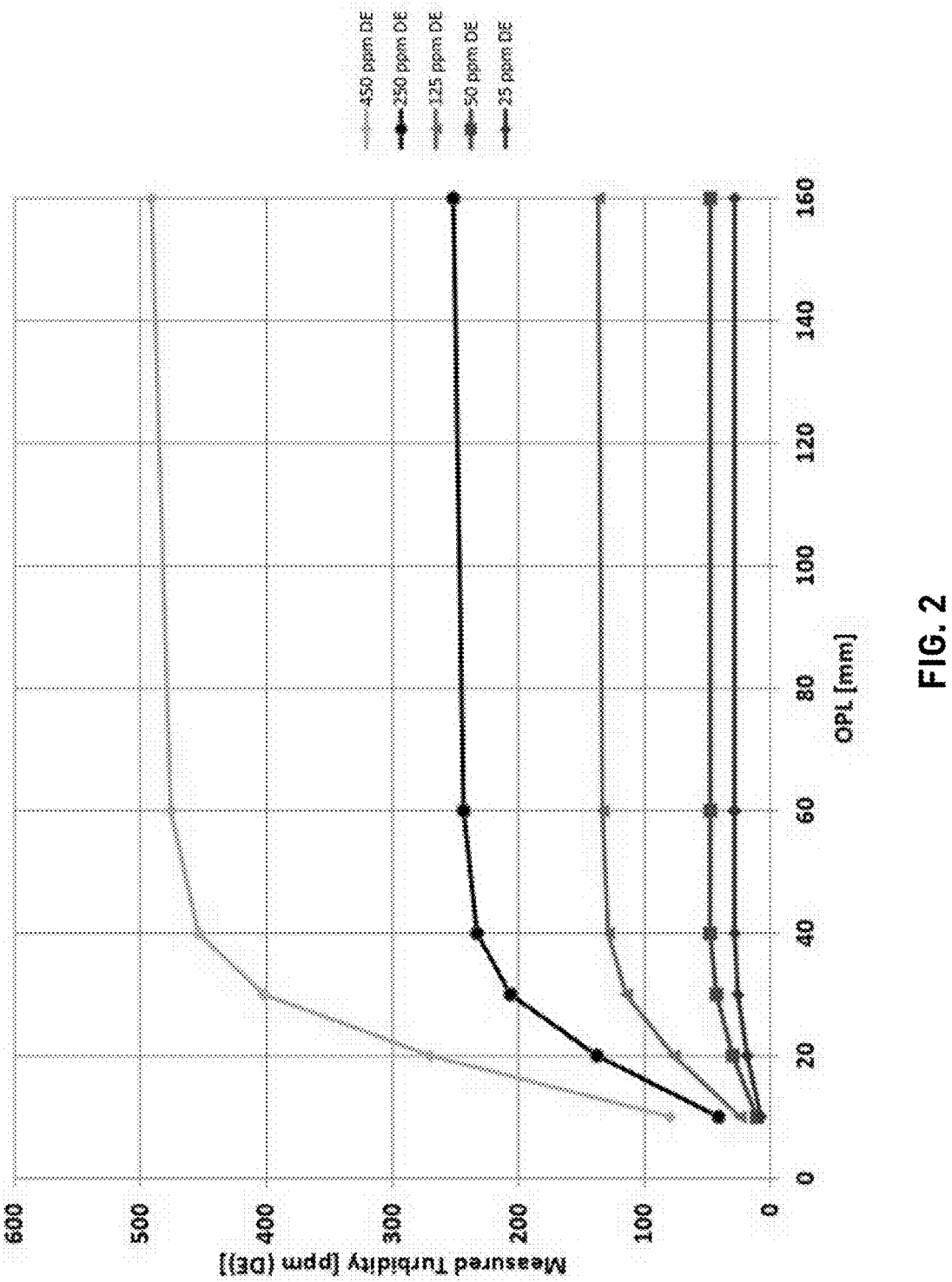
FIG. 2 is a graph showing measured turbidity of diatomaceous earth (DE) suspensions in parts per million (ppm) versus Optical Path Length (OPL) of an optical turbidity monitor in accordance with an embodiment.

An optical path length for the emitted light may be defined by a distance between the optical signal source and the optical sensor(s). As shown in FIG. 2 for turbidity measurements in standard diatomaceous earth suspensions using an optical turbidity monitor in accordance with the present disclosure, optical path length may affect the accuracy of turbidity measurements, particularly as particulate concentration increases. In some embodiments, the optical path length may be about 10 mm to about 300 mm. For example, the optical path length may be greater than about 10 mm, 15 mm, 20 mm, 25 mm, 30 mm, 35 mm, or 40 mm and less than about 300 mm. In some embodiments the optical turbidity monitor comprises an evanescent wave sensor that is adjacent to or in otherwise close proximity to the optical signal source.

An optical path length may be defined by a distance between the optical signal source and the optical sensor(s). In some embodiments, the optical path length may be about 10 mm to about 200 mm. For example, the optical path length may be greater than about 10 mm, 15 mm, 20 mm, 25 mm, 30 mm, 35 mm, or 40 mm and less than about 300.

As shown in FIG. 1, the separation system 100 can further comprise a control unit 128 operatively connected to the optical turbidity monitor 122, and configured to receive the turbidity value from the at least one optical turbidity monitor 122.

A method of processing a liquid solution with reduced scaling can employ components such as those described herein. In some embodiments, such a method can comprise operating a separation system of the type shown in FIG. 1. Using separation system 100 of FIG. 1 as an example, the method can comprise supplying a feed stream 106 of liquid solution to the separation module 102 at a flow rate and pressure to achieve separation of the feed stream 106 into at least one permeate stream 114 and concentrate stream 112. The optical turbidity monitor 122 measures turbidity of the concentrate stream 112 to generate a turbidity value.

The approaches encompassed by the present disclosure take advantage of the finding that homogeneous nucleation due to supersaturated conditions leads to an increase in concentrate turbidity, and that through continuous monitoring of turbidity this increase can be detected early enough to prevent membrane scaling. Accordingly, the methods and systems described herein include techniques of analyzing turbidity measurements to generate detectable data events that are closely correlated to the onset of homogeneous nucleation. In some embodiments, the turbidity value is generated by a mathematical operation on a plurality of detection signals provided by optical sensors in the optical turbidity monitor. Particularly the turbidity value can be a ratio between a scattering measurement and a transmittance measurement, termed low range (LR) turbidity. Dividing different signals by each other is a data analysis technique to remove noise of the turbidity reading due to, for instance, pressure and temperature fluctuations as well as fouling of windows in the monitor. Without being bound to a particular theory, using the ratio of two turbidity signals can contribute to improving crystal detection to the point that membrane scaling can be minimized. In some embodiments, signal conditioning techniques may be applied to reduce noise in the turbidity measurements, including but not limited to, applying a low pass frequency filter and filtering using a coherence function between two or more turbidity signals.

Another data analysis technique that may be implemented to improve detection is to use a time derivative of the turbidity value instead of the turbidity itself. As absolute turbidity can vary for each individual feed liquid, a first derivative with respect to time can be calculated to determine the rate of change in turbidity during the separation process. In this way, regardless of the background turbidity value, the system can detect an increase in turbidity that may occur due to crystal formation in the feed solution.

The method can further comprise determining a setpoint that corresponds to a condition of the concentrate stream that precedes scaling in the system. Particularly, the setpoint can be a value of turbidity derivative that corresponds to a concentration of a scalant mineral in the feed stream below which scaling of the membrane by the scalant mineral does not occur. Therefore, comparing the turbidity derivative to the setpoint enables the identification of scaling preconditions when the turbidity derivative equals or exceeds the setpoint. The interval from the commencement of the separation process up to the crossing of the setpoint can be termed a "concentration cycle." Referring again to the separation system 100 of FIG. 1, the control unit 128 can be configured to calculate a derivative of the turbidity value with respect to time and to compare the turbidity derivative to the setpoint.

In some embodiments, the setpoint is dynamically determined from turbidity measurements taken during the separation process, rather than setting a setpoint before the process begins. In this way, a setpoint can be automatically determined and implemented for a currently ongoing concentration cycle based upon the particular conditions of that cycle. A data analysis technique that can be implemented to enable such automation is turbidity derivative setpoint determination based on a signal to noise (SNR) of the turbidity derivative. This approach can also include calculating a moving average of the turbidity derivative over a time interval. For example, SNR can be calculated by Equation 1:

$$SNR = \frac{s - \mu}{\sigma} \qquad \text{(Equation 1)}$$

where s is the turbidity derivative, μ is the moving average of the turbidity derivative, and σ is the standard deviation of the turbidity derivative. In particular embodiments, the moving average is calculated over a time interval of about 10 seconds to about 1000 seconds.

In some embodiments, calculation of the SNR may be initiated with some time delay after turbidity measurement commences. For example, the time delay may be from about 1 minute to about 10 minutes. For example, the time delay may be greater than about 1 minute, about 2 minutes, about 3 minutes, about 4 minutes, about 5 minutes, about 6 minutes, about 7 minutes, or about 8 minutes, and less than about 10 minutes, about 9 minutes, about 8 minutes, about 7 minutes, about 6 minutes, about 5 minutes, about 4 minutes, about 3 minutes, or about 2 minutes. In some embodiments, calculation of the SNR may be initiated after a percentage of total liquid recovery has been accomplished, for example, after at least about 5% to about 50%, such as after about 5%, about 10%, about 15%, about 20%, about 25%, about 30%, about 35%, about 40%, about 45%, or about 50% liquid recovery. "Liquid recovery" refers to the ratio of permeate produced to the initial volume of untreated liquid solution.

Without being bound to a particular theory, the confidence with which one can ascribe an observed change in turbidity derivative to the onset of crystal formation is related to the magnitude of SNR. For example, according to the Rose criterion when this ratio is larger than 5, it can be concluded with 99.99994% certainty that the signal is significantly larger than the background noise. Accordingly, in some embodiments the setpoint can be some multiple of SNR, such as about 3 to about 10, or about 4 to about 6. Referring again to the separation system 100 of FIG. 1, the control unit 128 can be configured to utilize the above analysis techniques to dynamically determine the setpoint.

In addition to identifying pre-conditions for scaling due to a scalant mineral, the crossing of the setpoint by the turbidity derivative can be used as a trigger to initiate preventative measures to avoid, halt, or remedy scaling by that or other scalants. Different scalant minerals differ in which measures work best to mitigate or remove scaling, the measure(s) may be selected based upon the composition of the feed stream. For continuous flow separation processes of the type shown in FIG. 1 such measures can include, without limitation, decreasing the pressure and/or increasing the flow rate of the feed stream 106.

The approaches encompassed by the present disclosure include not only continuous flow separation processes but also batch and semi-batch separation processes. These aspects may be illustrated by the diagram of a closed-circuit separation system 300 shown in FIG. 3. Each component that is analogous to one described in FIG. 1 is indicated by the same reference number used in FIG. 1 but with the leading digit incremented to "2." The discussion of such components in the description of FIG. 1 also applies to the analogous component in FIG. 3, unless otherwise specified.

As shown, such a system can comprise a separation module 302 having an inlet 304 configured to receive a feed stream 306 of a liquid solution having solutes dissolved or suspended therein. The feed stream 306 can be supplied from a source 308 of the liquid solution, such as a storage tank or reservoir. The separation module 302 can comprise a separating element 310 configured to separate one or more of the solutes from the feed stream 306 and to concentrate them into a concentrate stream 312. The remaining liquid from the feed stream 306 is produced as a permeate stream 314. The separation system 300 can further comprise an optical turbidity monitor 322 fluidically connected to the separation module 302 and situated to measure a turbidity value of the concentrate stream 312. The separation system 300 can further comprise a control unit 328 operatively connected to the optical turbidity monitor 322, and configured to receive the turbidity value from the at least one optical turbidity monitor 322.

The separation system 300 includes a closed-circuit component that allows for a concentration cycle comprising repeated iterations of the separation process on a batch of liquid solution. Accordingly, in some embodiments, a method of processing a liquid solution can comprise comparing the turbidity derivative to the setpoint and, if the turbidity derivative is below the setpoint, recycling the concentrate stream 312 through the separation module 302 to continue separation, producing additional permeate as well as a further concentrating concentrate stream. When the setpoint is reached, the concentration cycle can be ended by diverting the concentrate stream 312 away from the separation module 302 for disposal or for other processing. For a batch process, the recycling step can comprise replacing the previous feed stream 306 i.e., supplying the concentrate stream 312 undiluted to the separation module 302. Alternatively, in a semi-batch process recycling comprises combining the concentrate stream 312 with additional liquid solution in the feed stream 306.

The separation system 300 can be configured to facilitate selective automation of the above flow patterns. As shown, the separation system 300 can include a valve unit 330 situated downstream of the optical turbidity monitor 322 and configured to alternate between a concentration mode comprising directing the concentrate stream 312 to the separation module 302 for further concentration by the separating element; and a disposal mode comprising diverting the concentrate stream away from the separation module 302. The valve unit 330 can be connected to, and controlled by, the control unit 328 so that the control unit 328 selectively actuates the valve unit 330 in the appropriate mode depending on the comparison between the turbidity derivative and the setpoint.

As discussed above, the crossing of the setpoint by the turbidity derivative can also be used as a trigger to initiate preventative measures selected to avoid, halt, or remedy scaling by that or other scalants. For separation processes of the type shown in FIG. 3 such measures can include, without limitation, one or more of: flushing with undersaturated solution, osmotic backflushing, flow reversal, chemical cleaning, adding an antiscalant to the feed stream, and adjusting the pH of the feed stream.

Figure 3:
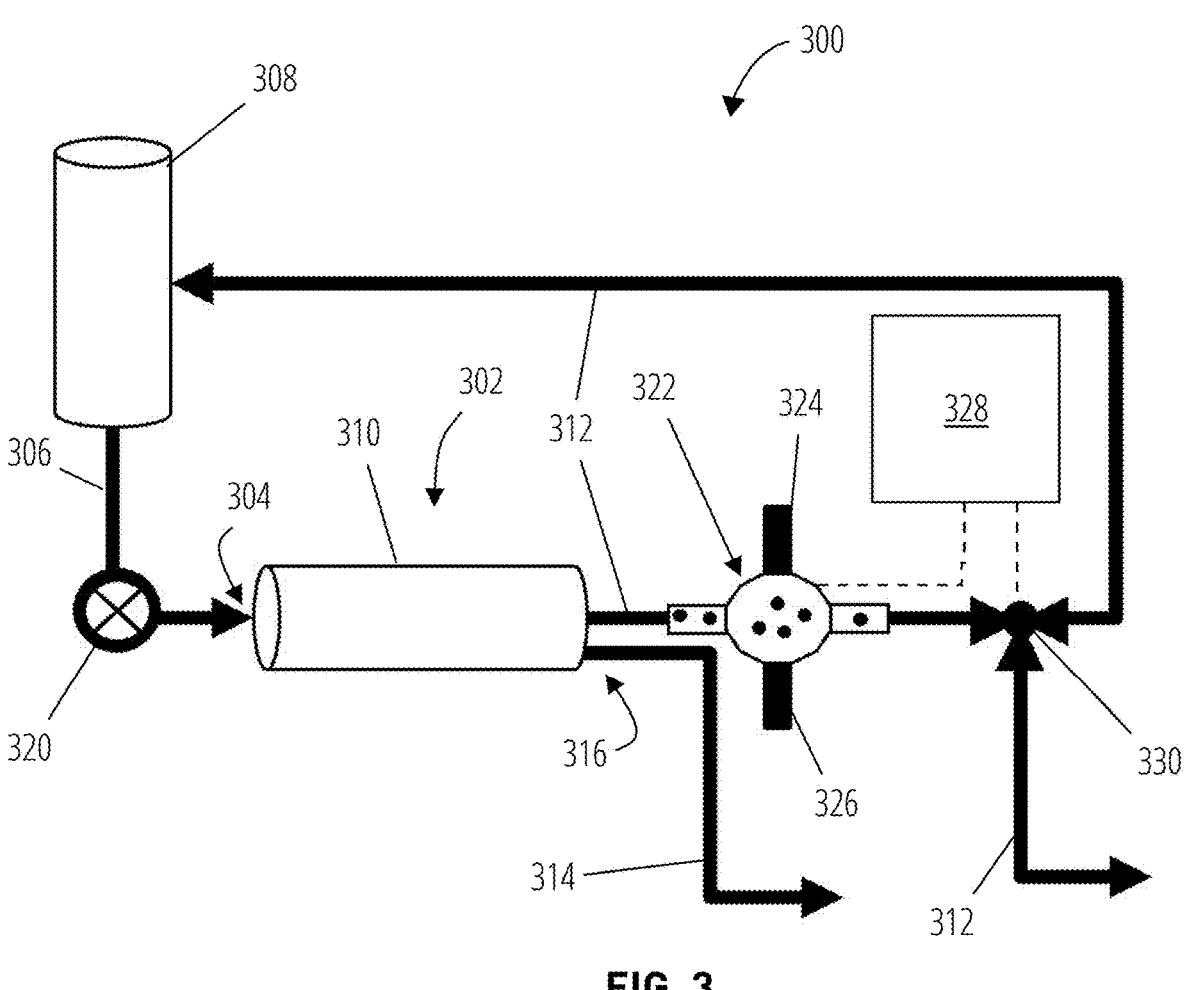
FIG. 3 is a flow diagram of a separation system in accordance with another embodiment.

The operation of a system such as shown in FIG. 3 can produce an output stream in which solutes of the original feed stream are at least highly concentrated, and potentially saturated or supersaturated. Accordingly, after actuation of disposal mode the method can further comprise recovering one or more solutes from the discharged concentrate. For example, the concentrate may be subjected to mechanical, chemical, or thermal steps selected to cause solutes to precipitate or otherwise separate from the liquid, so that the solutes may be recovered. In some embodiments, the remaining liquid may be supplied to the separation module 302 to undergo further separation/concentration.

The approaches described herein can be used for early detection of scaling by types of scalant minerals including, but not limited to, carbonates, sulfates, silicates, phosphates and nitrates. Particular examples include gypsum, calcium carbonate, silica, strontium sulfate, barium sulfate, and ammonium nitrate.

Figure 4:
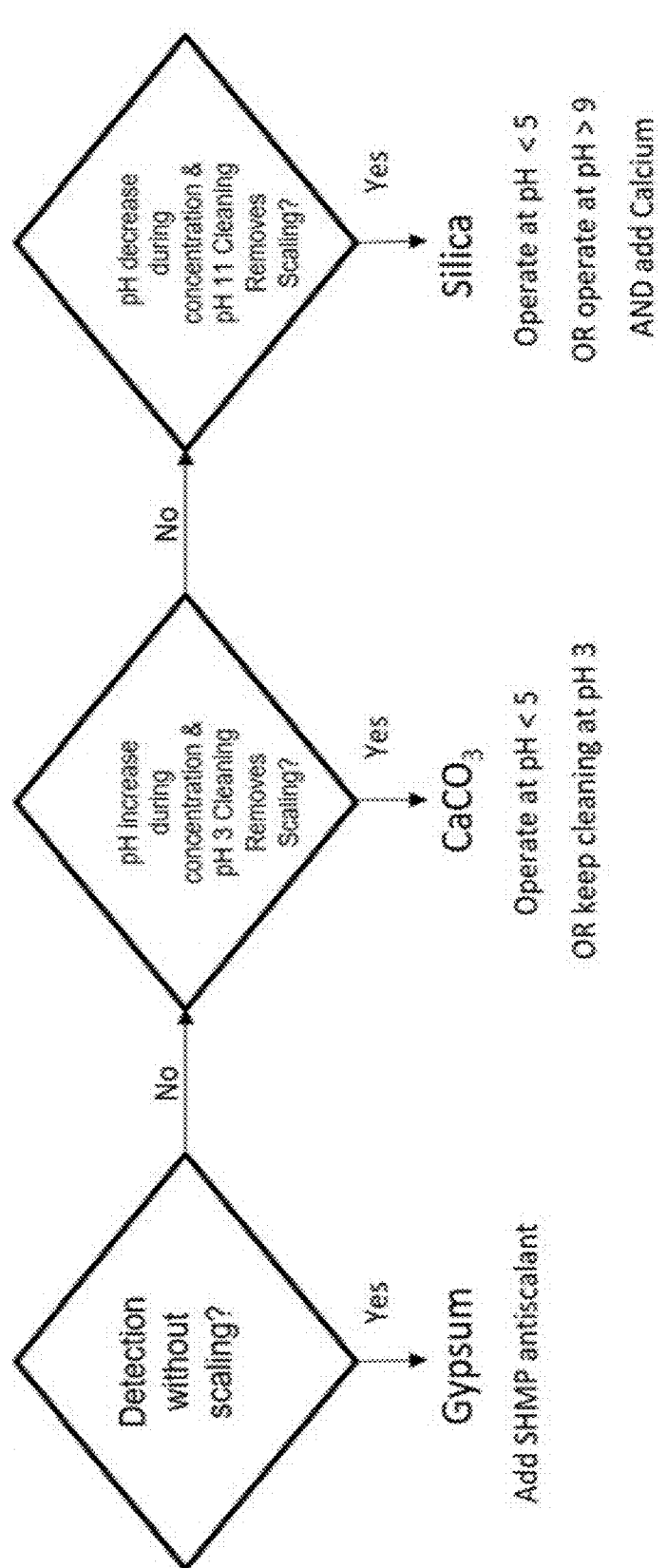
FIG. 4 is a decision tree for scalant identification in accordance with an embodiment.

Apart from minimizing membrane scaling, the methods described herein can also be used to identify type of scalants, for example, if combined with a cleaning step after a number of concentration cycles. In some embodiments, this may be accomplished by analyzing one or more turbidity values of the concentrate stream. For example, as scalants may differ in the way increasing their concentration affects turbidity, the evolution of a turbidity value as the separation process progresses can be an indicator of scalant identity. In some embodiments, this may be accomplished by measuring the pressure of the concentrate stream, particularly changes in concentrate pressure over two or more cycles. The nature of the change, as well as the effectiveness of different cleaning approaches, can be diagnostic of which primary scalant is present in the liquid solution. Once the scalant is identified, this information can be used to select appropriate preventative measures. An example of a decision tree based on this approach is shown in FIG. 4. As shown, if a turbidity signal is detected without a pressure increase, gypsum is indicated. If a turbidity signal is detected with a pressure increase and an acid cleaning can remove the scaling, the scalant is calcium carbonate and system can be operated below pH 5 to avoid further scaling. Conversely, if a turbidity signal is detected with an increase in pressure and an acid cleaning cannot remove the scaling, but a base cleaning at pH 11 can remove it, it is silica scaling and the system can be operated below pH 5 or above pH 10 to avoid further scaling.

In some embodiments, analysis of these types of data over repeated concentration cycles may be incorporated into setpoint determination for a successive cycle in order provide an improved result. More particularly, the methods described herein can comprise determining an improved setpoint over time by repetition of one or more of: measuring a pressure of the concentrate stream, analyzing the turbidity value of the concentrate stream, and assessing effectiveness of a previously applied preventative measure, such as any of the measures described above. In certain embodiments, the preventative measure can comprise at least one of: flushing with undersaturated solution, osmotic backflushing, flow reversal, chemical cleaning, adding an antiscalant to the feed stream, and adjusting a pH of the feed stream. In some embodiments, the systems described herein can be configured for machine learning, where data from repeated concentration cycles can be used to iteratively train the control unit or other components to provide improved setpoint determination.

EXAMPLES

1. Solution Chemistry

Five synthetic solutions were tested: single-salt solutions of calcium sulfate, calcium bicarbonate and silica, as well as two different mixed-salt solutions based on water analyses of feed water from desalination facilities in the U.S.A. Calcium sulfate solutions were made using calcium chloride dihydrate (Sigma-Aldrich) and sodium sulfate anhydrous (Sigma-Aldrich). For the calcium carbonate and calcium bicarbonate, calcium chloride dihydrate (Sigma-Aldrich) and sodium carbonate (Fisher Scientific) and sodium bicarbonate (Fisher Scientific) were used. For the silica, sodium metasilicate pentahydrate (Aldrich chemistry) was used. These chemicals are highly soluble in water and allow the creation of saturated and supersaturated solutions.

Table 1 shows the feed water composition from both sites (Yuma, Ariz., and San Luis, Calif.). The desalination facility in Yuma, Ariz. treats irrigation return flow from a local irrigation and drainage district and San Luis desalination facility treats agricultural runoff. For the synthetic Yuma feed (YF) solution barium, boron, and iron were left out, because of their low concentrations in the original feed water. Boron was left in the synthetic San Luis feed (SLF) solution. Ammonia was not added to either solution to avoid biological growth in the bench scale system and because it does not contribute to scaling. Monochloramine is a disinfectant and was not added to the synthetic solutions because it has a high solubility and disinfection was unnecessary.

The sodium concentration in YF and SLF was slightly higher than in the original because the reagents used to create YF and SLF were soluble salts of sodium or chloride. Sodium chloride was also added to increase the chloride concentration to match the amount in the original YF and SLF. The average pH of YF was 5.86 and the pH of SLF was between 7.0-7.3. The pH of YF water solutions was adjusted to 5.5-6.0 using a hydrochloric acid solution and a sodium hydroxide solution. The SLF was adjusted to a pH range of 7.0-7.5. The scaling tendency of YF and SLF solutions as a function of water recovery at a temperature of 20.00° C. was calculated using OLI Stream Analyzer (OLI systems Inc.), which gave the saturation ratio as a function of water recovery based on the equilibrium concentration. YF and SLF were treated with antiscalant to reach higher recoveries in the desalination facilities. YF was treated with SHMP and SLF with Vitec 7400. Bench scale tests were performed with and without these antiscalants.

TABLE 1

| | | | |
|---|---|---|---|
| | Composition of the YF and SLF solutions | | |
| No. | Constituents, Chemical compounds used, Manufacturer | Concentration in original Yuma feed, mg L$^{-1}$ | Concentration in original San Luis feed, mg L$^{-1}$ |
| 1 | Aluminium | 0.00 | 0.01 |
| 2 | Barium | 0.01 | 0.01 |
| 3 | Bicarbonate as CaCO$_3$, Sodium Bicarbonate, Mallinckrodt Chemicals | 5.63 | 295.8 |
| 4 | Boron | 0.94 | 33.8 |
| 5 | Calcium, Calcium Chloride Dihydrate, Sigma-Aldrich | 95.10 | 536.00 |
| 6 | Carbonate as CaCO$_3$ | 0.00 | 0.00 |
| 7 | Chloride, Sodium Chloride, Fisher Chemical | 577.00 | 2110.00 |
| 8 | Fluoride, Sodium Fluoride, Sigma-Aldrich | 4.70 | 0.00 |
| 9 | Iron | 0.02 | 0.00 |
| 10 | Manganese | 0.00 | 0.01 |
| 11 | Magnesium, Magnesium Chloride Hexahydrate, Sigma-Aldrich | 53.80 | 33.79 |
| 12 | Nitrate as N, Sodium Nitrate, Fisher-Scientific | 6.40 | 6.3 |
| 13 | PO$_4$ as P, Sodium Phosphate Dibasic, Sigma-Aldrich | 3.70 | 2.00 |
| 14 | Potassium, Potassium Chloride, Aldrich Chemical Company Inc. | 7.26 | 3.51 |
| 15 | Silica, Sodium Metasilicate Pentahydrate, Aldrich Chemistry | 7.80 | 32.70 |
| 16 | Sodium, Sodium Chloride, Fisher Chemical | 589.00 | 3379.98 |
| 17 | Strontium, Strontium Chloride Hexahydrate, Sigma-Aldrich | 1.39 | 7.61 |
| 18 | Sulfate, Sodium Sulphate, Sigma-Aldrich | 858.00 | 6340.00 |
| 19 | Total Alkalinity as CaCO$_3$ | 5.63 | 295.80 |
| 20 | Free Ammonia as N | 1.73 | 1.20 |
| 21 | Ammonium as N | | 1.10 |

2. Membranes and Flow Cells

Two different membranes were tested: a spiral wound PA TFC NF 90 membrane (M-N2514A9, AMI Membranes) and a spiral wound RO membrane (M-S2514A, AMI Membranes). Specific details regarding the membrane properties and how compacting and integrity tests (IT's) were conducted are shown in Tables 2 and 3.

A spiral wound NF 90 membrane was chosen for the bench scale system tests with 1.75 g L$^{-1}$ calcium sulfate. A spiral wound RO membrane was used to test the calcium bicarbonate solution and synthetic Yuma solution.

TABLE 2

Description of the membranes

| Membrane | Product No. and Manufacturer | Surface area, cm$^2$ (ft$^2$) | pH range | Max. pressure cell capability, kPa (psi) | Average salt (NaCl) rejection, % |
|---|---|---|---|---|---|
| NF 90, spiral wound | M-N2514A9, AMI Membranes | 6,290 (6.78) | 3-10 | 2,757.9 (400) | 90.0 |
| RO, spiral wound | M-S2514A, AMI Membranes | 8,129 (8.75) | 2-11 | 6,894.8 (1,000) | 99.2 |

TABLE 3

Description of compacting and integrity tests

| Process | Parameters | NF 90, spiral wound | RO, spiral wound |
|---|---|---|---|
| Compacting | Pressure, kPa (psi) | 1,516.9 (220) | Pre-compacted by manufacturer |
| | Flow rate, L min.$^{-1}$ | 2.5 | |
| | Solution | 0.5 g L$^{-1}$ NaCl | |
| | Duration, hr. | ~24 | |
| | Temperature, ° C. | ~20 | |
| Integrity test | Flux, L m$^{-2}$ hr$^{-1}$ | 30 | 20 |
| | Flow rate, L min.$^{-1}$ | 2.5 | 2.0 |
| | Solution | 0.5 g L$^{-1}$ NaCl | 0.5 g L$^{-1}$ NaCl |
| | Duration, hr | ~2 | ~2 |
| | Temperature, ° C. | ~20 | ~20 |

3. Turbidity Monitor

A turbidity monitor designed to measure inline turbidity was used for the YF solution tests as well as to detect the polymerization of silica colloids. A lamp on one side of the monitor body emits light which passes through the solution and into a detector on the other side of the monitor. The lamp and detector are placed at an 0° angle to each other. The controller measures the difference in the light emitted and light absorbed. The default turbidity unit for the monitor is formazin turbidity units (FTU). This unit was converted into nephelometric turbidity units (NTU) using known turbidity standards (StabCal 0.088, 1.0, 10, 100 NTU, Hach) for the calibration of the monitor. This was done for early tests with this monitor to compare the CSTR test results with the bench scale system results. A moving average over five seconds was applied to measured value of the turbidity monitor the raw measurements to smooth out the effect of noise.

Two other turbidity monitors were used to detect crystallization of calcium sulfate and calcium carbonate crystals as well as to detect the polymerization of silica colloids and to analyze the SLF solution. These monitors each have a detector for the emitted light at a 0° angle, termed high range turbidity (HR), and several detectors (above and below the 0° detector) at a 11° angle to detect scattered light. One of the monitors has an additional scattered light detector at a 90° angle. A ratio between the scattered light (at 11° or 90°) and the absorbed light at 0°, termed low range (LR) turbidity, is calculated by the control system of the CCD unit. Dividing different signals by each other is a data analysis technique to remove noise of the turbidity reading due to for instance pressure and temperature fluctuations as well as window fouling.

Another data analysis technique that was implemented to improve detection was to look at the turbidity derivative instead of the turbidity itself. Because the absolute turbidity varies for each individual feed water, the first derivative with respect to time was calculated to determine the rate of change in turbidity during the bench scale system tests. Thus, regardless of the background turbidity value, the system was able to detect an increase in turbidity that may occur due to crystal formation in the feed solution. Turbidity rate of change was calculated using Equation 2:

$$\frac{dTu}{dt} = \frac{(Tu_{n+1} - Tu_n)}{\Delta t} \qquad \text{(Equation 2)}$$

where Tu$_n$ is the initial turbidity, Tu$_{n+1}$ is the turbidity after a set time from the initial turbidity measurement, specified as $\Delta t$. To reduce noise in the turbidity derivative, a moving average over 60 seconds was applied.

A data analysis technique that was implemented to enable full automation of the water treatment system was a dynamic turbidity derivative setpoint determination based on the signal to noise ratio as defined in Equation 1 above. When this ratio is larger than 5, it can be concluded with 99.99994% certainty according to the Rose criterion that the signal is significantly larger than the background noise. Accordingly, when the turbidity derivative reached 5 times the background noise, the system drained the concentrate and started a new concentration cycle.

4. Description of the Bench Scale Separation System

Figure 5:
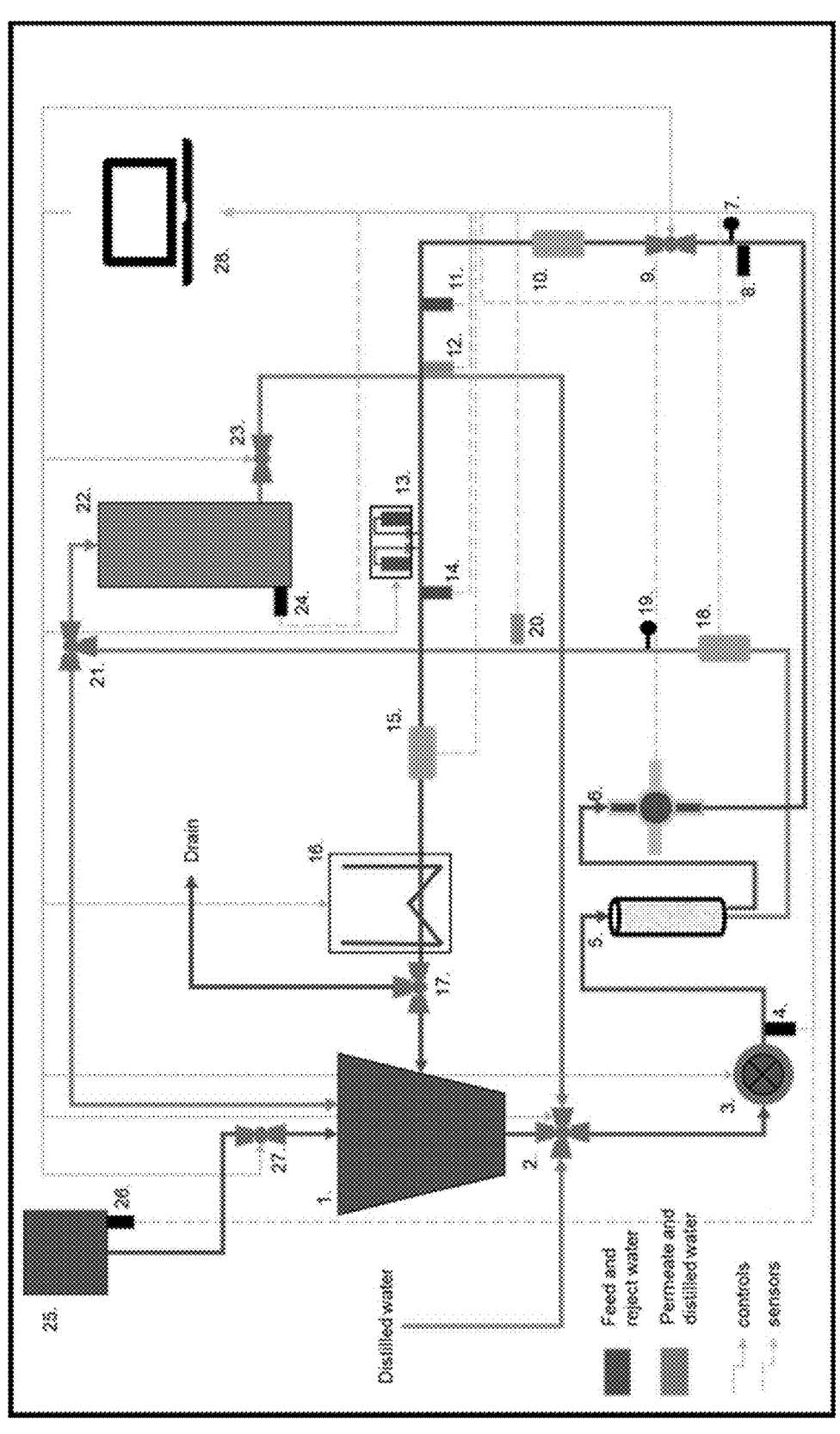
FIG. 5 is a bench-scale separation system flow design; Legend: 1—feed tank; 2—two 2-way valves; 3—Feed pump; 4—Pressure sensor; 5—membrane; 6—turbidity sensor; 7—Analog pressure gauge; 8—Pressure sensor; 9—Pressure control valve; 10—Analog reject flowmeter; 11—Temperature probe; 12—Reject conductivity sensor; 13—acid & base dosing; 14—pH sensor; 15—Reject flowmeter; 16—Heat exchanger; 17—Three way valve for draining the system; 18—Permeate flow meter; 19—Analogue pressure gauge; 20—Permeate conductivity sensor; 21—Three way valve directing permeate flow depending on recirculation or concentration mode; 22—Permeate tank; 23—Release valve for draining permeate tank; 24—Pressure sensor; 25—Reserve feed tank; 26—Pressure sensor; 27—Release valve for draining reserve feed tank; and 28—Control system.

A diagram of the bench scale separation system is shown in FIG. 5, in which the following components are depicted: 1—feed tank; 2—two 2-way valves; 3—Feed pump; 4 Pressure sensor; 5—membrane; 6—turbidity sensor; 7—Analog pressure gauge; 8—Pressure sensor; 9—Pressure control valve; 10—Analog reject flowmeter; 11—Temperature probe; 12—Reject conductivity sensor; 13—acid & base dosing; 14—pH sensor; 15—Reject flowmeter; 16—Heat exchanger; 17—Three-way valve for draining the system; 18—Permeate flow meter; 19—Analogue pressure gauge; 20—Permeate conductivity sensor; 21—Three way valve directing permeate flow depending on recirculation or concentration mode; 22—Permeate tank; 23—Release valve for draining permeate tank; 24—Pressure sensor; 25—Reserve feed tank; 26—Pressure sensor; 27—Release valve for draining reserve feed tank; and 28—Control system.

According to its design, feed water flows through the flat sheet or spiral membrane module before reaching the turbidity monitor. The reject flows through a heat exchanger back into the feed tank and the flowrate, pressure, conductivity, and temperature of the reject are measured. The system was capable at running at constant flow rate (L min$^{-1}$), pressure or water flux (L m$^{-2}$ h$^{-1}$) (abbreviated LMH). The system was designed to drain the permeate tank back into the feed tank once the setpoint of the turbidity derivative was reached. Gravitation and pump suction drained the permeate directly into the reject flow line. Depending on the synthetic solutions the feed was either replaced automatically by a pump from a larger reserve tank or recycled at the end of the cycle.

Flow rate of the reject was measured using a turbine flowmeter (800-Series NSF approved turbine flow meter, Titan Enterprise, JLC International, City, State). The permeate flow meter (Atrato ultrasonic flowmeter, Titan, JLC International, City, State) was used to calculate the flux through the membrane (Equation 3):

$$J_M = \frac{Q_p}{A_M}$$ (Equation 3)

where $J_M$ is the flux through the membrane in units, $Q_p$ is the flow rate of the permeate as measured in units and $A_M$ is the membrane surface area in $m^2$.

Two conductivity sensors (EW-35408-54, Oakton) measured the permeate and reject conductivity. The permeate and reject conductivity sensors were calibrated using conductivity standards (5,000 μS cm⁻¹ and 10,000 μS cm⁻¹, Ricca chemical company). To estimate the salt rejection in operation, conductivity rejection was calculated based on permeate and reject conductivity using Equation 4:

$$\sigma_R = \frac{(\sigma_r - \sigma_p)}{\sigma_r} * 100$$ (Equation 4)

where $\sigma_R$ is the conductivity rejection (%), $\sigma_r$ is the conductivity of the reject flow, and $\sigma_p$ is the conductivity of the permeate flow in μS cm⁻¹. The conductivity rejection value was later used to calculate the theoretical concentration of the solution and using the conductivity rejection as the salt rejection factor using Equation 5:

$$c_T = c_0 * \left( \frac{1}{\left( 1 - \frac{(V_p - V_o)}{V_p} \right)} \right)^{\frac{\sigma_R}{100}}$$ (Equation 5)

where is the theoretical concentration in g L⁻¹, $c_o$ is the initial concentration (g L⁻¹), $V_p$ is the permeate volume in L, $V_0$ is the initial permeate volume (L) and $V_p$ is the feed volume (L). For a precise estimate of the rejection of specific ions, samples were analyzed using ion chromatography (IC; ICS-90, Dionex) and inductively coupled plasma atomic emission spectroscopy (ICP-AES; Optima 5300, Perkin-Elmer).

The system utilizes three pressure sensors of the same type and manufacturer (PX309-500G5V, Omega). Two were used to determine permeate and feed replacement volume based on the linear relationship between the water column and pressure. The third pressure sensor was used to measure the pressure of the reject flow.

Due to the pipe friction and pressure in the system, cooling was utilized to enable operation at a constant temperature of ~20° C. A heat exchanger was installed for this and used process chilled water from the buildings cooling supply to maintain the temperature of the reject feed in the system. A temperature probe (EI-1034, LabJack) measured the temperature and the system opened or closed the supply of cooling water to maintain temperature using a PID algorithm.

For monitoring and maintaining the pH for the YF and SLF solutions a pH sensor (WD-59001-65, Oakton) measured the pH and a control system adjusted the pH by dosing a sodium hydroxide or hydrochloric acid solution into the system.

5. Bench Scale System Testing and Membranes 5.1 Single Salt Solution Testing

Synthetic solutions of calcium sulfate, calcium bicarbonate and silica were concentrated until the rate of turbidity increase reached the setpoint and the collected permeate was either drained back to the feed to dilute it to its original concentration or drained and replaced with a new feed solution. Feed concentration then continued, and this procedure was repeated for 5 (silica), 10 (Calcium carbonate) to 20 cycles (gypsum) before the experiment was shut down. Before and after testing, the system was rinsed with deionized water before conducting an integrity test. An LR turbidity monitor was used for all single salt solution tests.

For the calcium carbonate system tests, the feed solution was made with 600 mg L⁻¹ calcium bicarbonate and 2.00 g L⁻¹ sodium chloride solution. The pH of the solution was adjusted to ~7. When the system went into concentration mode, the pH of the solution was not adjusted.

The pH would increase to a point at which calcium bicarbonate would convert into calcium carbonate and the calcium carbonate crystals precipitate out of solution. The system was cleaned afterwards at pH 3.5 for 12 hours to remove calcium carbonate crystals.

The silica system tests were conducted with a solution of 110 mg L⁻¹ silica, a 275 mg L⁻¹ calcium and 0.5 g L⁻¹ sodium chloride. The pH of the tests was set to 8.5 and maintained during the experiment. After the silica tests the system was cleaned with a pH 10.5 solution at high pressure for 12 hours to remove colloids.

5.2 Brackish Water Testing

After the single salt solution tests, YF and SLF solutions were prepared with and without antiscalant and concentrated using the small RO spiral membrane. For the experiments with antiscalant, 1.5 mg L⁻¹ of SHMP was added to YF and 3 mg L⁻¹ of Vitec 7400 was added to SLF. The solution was concentrated in the CCD system until the setpoint was reached. Because both the YF and SLF contained silica, the feed was drained after reaching the setpoint, the system rinsed with deionized water and replaced with a new feed solution. After this the cycle was repeated. This was done for a total of 5 cycles.

TABLE 4

| | Parameters of the synthetic solution tests | | | | | |
|---|---|---|---|---|---|---|
| Parameters | Turbidity Optimization tests | Calcium sulfate | Calcium carbonate | Silica | YF | SLF |
| Membrane type | NF 90 flat sheet | RO spiral wound | RO spiral wound | RO spiral wound | RO spiral wound | RO spiral wound |
| Flow rate, L min.⁻¹ | 1.5 | 1.5 | 1.5 | 1.5 | 1.5 | 1.5 |
| Cross flow | 0.02 | 0.01 | 0.01 | 0.02 | 0.01 | 0.01 |

TABLE 4-continued

| | Parameters of the synthetic solution tests | | | | | |
|---|---|---|---|---|---|---|
| Parameters | Turbidity Optimization tests | Calcium sulfate | Calcium carbonate | Silica | YF | SLF |
| velocity, m s$^{-1}$ | | | | | | |
| Flux, L m$^{-2}$ hr$^{-1}$ | 30 | 20 | 20 | 20 | 20 | 20 |
| Concentration, g L$^{-1}$ | 1.5 | 1.75 | 0.6 (calcium bicarbonate) | 0.11 | — | — |
| Turbidity monitor used | HR | LR | LR | LR | HR | LR |
| Turbidity derivative setpoint, NTU hr$^{-1}$/FTU hr$^{-1}$ | 0.10, 0.15, 0.20 and 0.25 | 0.5 | 0.35 | | 1.5 | 1.5 |
| pH | Not observed | 7.0-7.5 | 7.0-8.0 | ~8.5 | 5.5-6.0 | 7.0-7.5 |
| Feed volume, L | | 21.1 | 35 | 25 | | 15 |
| System dead volume with the membrane, L | 0.5 | 1.1 | 1.1 | 1.1 | 1.1 | 1.1 |

6. Bench Scale System Tests

6.1 Pure Salt Solution Testing

All of the pure salt solution bench scale system tests ran through an RO spiral membrane with a flow rate of 1.5 L min.$^{-1}$, a flux of 20 L m$^{-2}$ hr$^{-1}$ and with the turbidity monitor attached to the system. The monitor gives three turbidity readings: one for the 0° angle, one for the ratio of the 11° angle over the 0° angle, and one for the ratio of the 90° angle over the 0° angle. The 0° angle values are termed high range (HR) and the ratios are termed low range (LR). The LR readings were used for the determination of crystal formation/polymerization of colloids.

A setpoint in each single salt solution was determined using the SNR of the derivative of one of the LR turbidity values. Once the setpoint was reached in a cycle, the permeate tank was drained to dilute the feed back to the initial concentration and the pressure valve opened completely. After that the feed was drained and the system rinsed with deionized water before new feed solution was added to the system. This was done for a maximum of 20 cycles.

6.1.1 Calcium Sulfate

Figure 6:
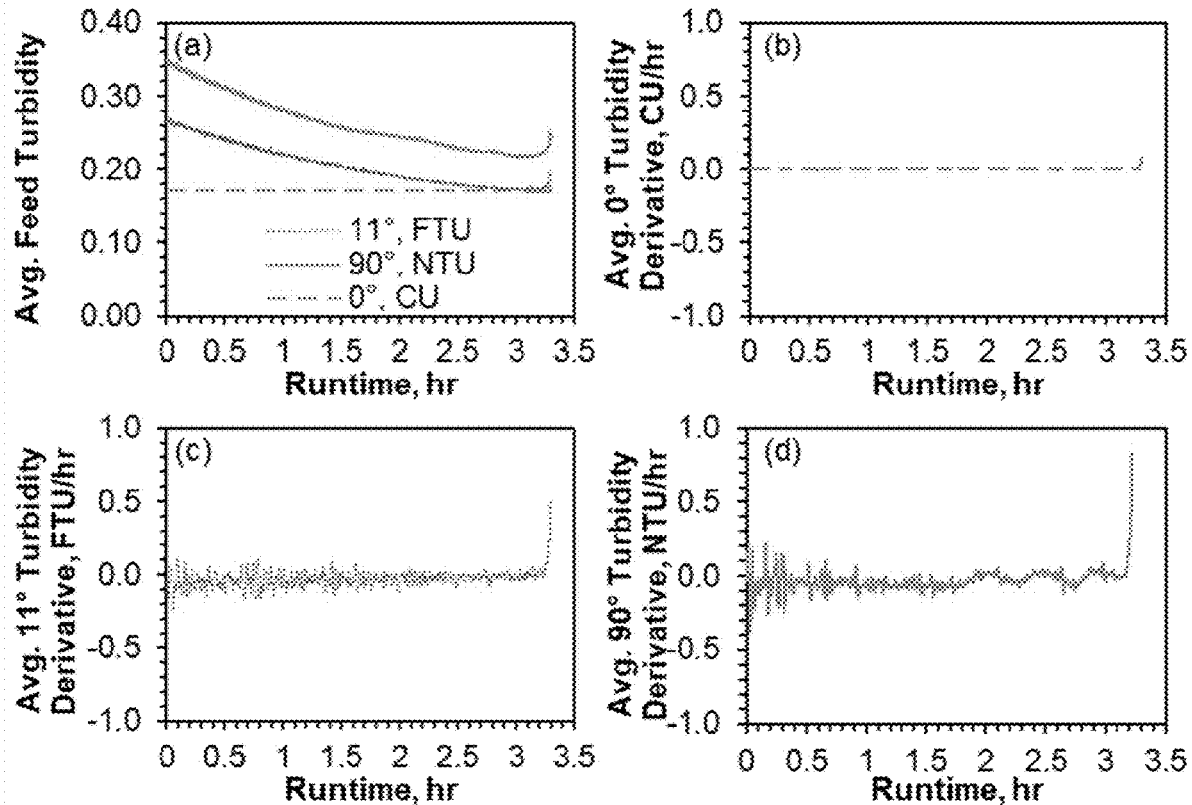
FIG. 6 shows results of bench-scale test of a calcium sulfate (gypsum) solution: Panel a: Feed turbidity over runtime (%) for the first cycle of the 0° degree turbidity signal (green line), and the 11° over 0° (blue trace) and 90° over 0° (orange trace) LR turbidity signal; Panel b: Turbidity derivative over runtime (%) for the first cycle of the 0° degree turbidity signal (HR); Panel c: Turbidity derivative over runtime (%) for the first cycle of the 11° over 0° degree turbidity ratio; Panel d: Turbidity derivative over runtime (%) for the first cycle of the 90° over 0° degree turbidity ratio.

As shown in FIG. 6 panel (a), a significant drop in both the 11° (blue trace) and 90° (orange trace) LR turbidity occurred over time. This was due to the filtering action of spacers in the membrane module and also the pre-crystallization ordering of the solution. As such, these signals were not suitable setpoint triggers. However, both the 11° (Panel c) and 90° (Panel d) LR turbidity derivatives oscillated around 0 until crystallization onset. Once the turbidity derivative of 0.5 FTU hr$^{-1}$ was reached, the permeate volume drained until the dead volume (3.00 L) in the permeate tank was reached. At the same time the pressure valve opened completely to release pressure and allow for low flux during cleaning.

Figure 7:
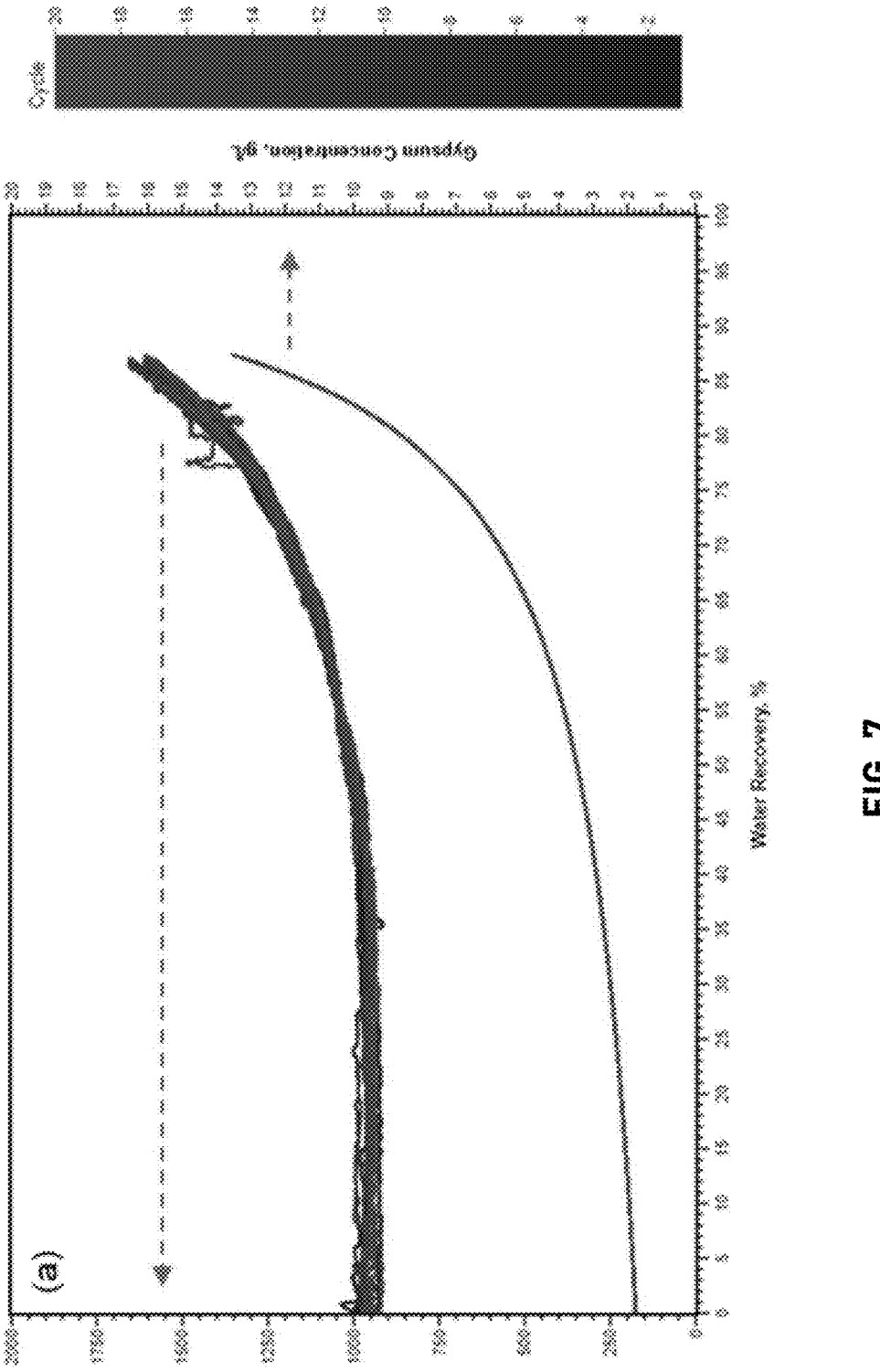
FIG. 7 is a graph showing the evolution of average reject pressure over 20 concentration cycles and gypsum concentration using a setpoint based on the 11° turbidity derivative for a calcium sulfate solution.

No scaling took place, as indicated by the minimum reject pressure being similar in all 20 cycles and developing similarly in all of them. An example of this is shown in FIG. 7 for tests using a setpoint based on the 11° turbidity derivative). Concentration consistently reached 12.5 g/L gypsum (6.1× saturation) using the 11° setpoint, and 11.5 g/L gypsum (5.6× saturation) using the 90° setpoint. Integrity tests performed after these experiments required a minuscule increase of 20 kPa or 1% after 20 cycles to maintain similar water flux as a new membrane. This scaling could be easily removed by a commercial gypsum scale cleaner.

During and for a short period after draining the permeate tank, the absolute turbidity and the turbidity derivative fluctuated strongly due to crystals dissolving and bubbles being introduced into the system during the draining event. The system ignored the turbidity derivative for 5 min. after draining the permeate tank to ensure the turbidity derivative setpoint was not triggered by bubbles.

Figure 8:
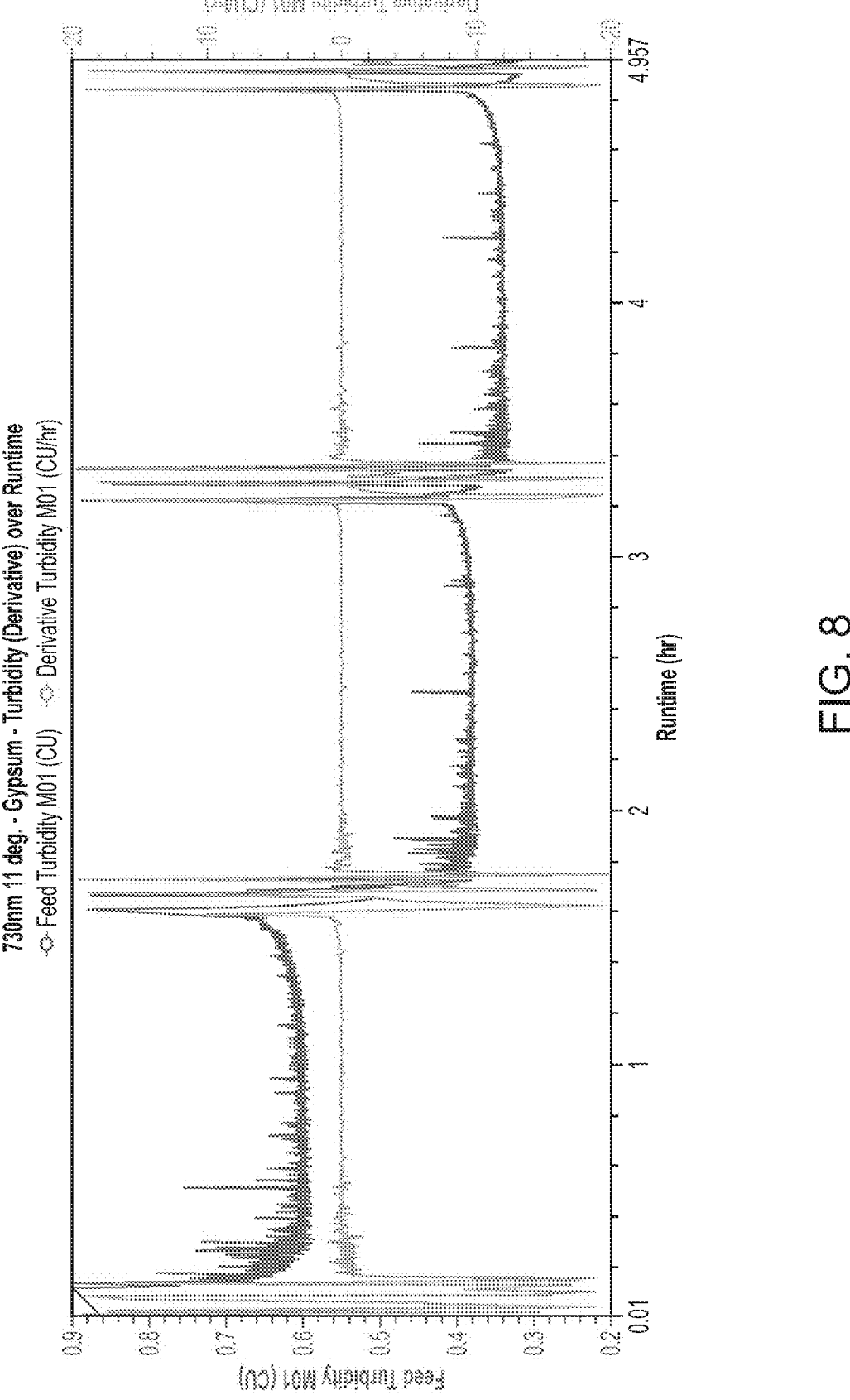
FIG. 8 is a graph showing the evolution of turbidity versus turbidity derivative over time of the 11° over 0° LR turbidity signal of a bench-scale test of a calcium sulfate (gypsum) solution for three consecutive cycles.

FIG. 8 shows the evolution of turbidity versus turbidity derivative over time of the 11° over 0° turbidity signal of a bench-scale test of a calcium sulfate (gypsum) solution for three consecutive cycles. As shown, absolute turbidity changed from cycle to cycle, while the turbidity derivative was consistent over all cycles.

Figure 9:
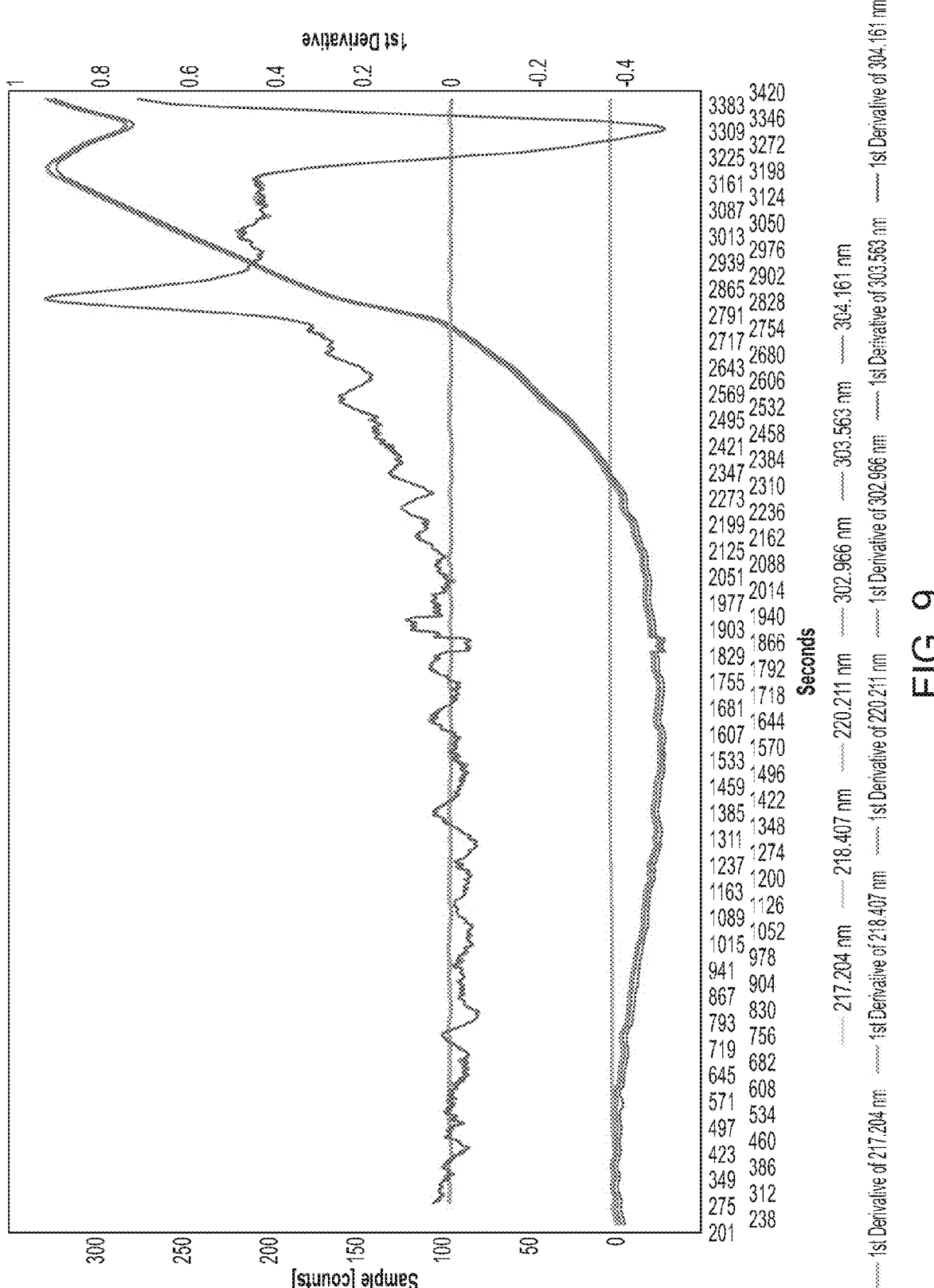
FIG. 9 is a graph showing the evolution of turbidity and turbidity derivative for different wavelengths over one concentration cycle using an attenuated total reflectance probe (ATR) for a gypsum solution.

A bench-scale test of the gypsum solution was performed in which an attenuated total reflectance probe (ATR) to measure turbidity. FIG. 9 shows the evolution of turbidity and turbidity derivative over a single concentration cycle using different wavelengths of emitted light.

6.1.2 Calcium Carbonate

A 35 L feed volume of 600 mg L$^{-1}$ calcium bicarbonate and 2.0 g L$^{-1}$ sodium chloride solution was treated using the spiral wound RO membrane. Once the automatically calculated turbidity derivative setpoint was reached, the permeate volume drained until the permeate tank dead volume (3.00 L) was reached. At the same time the pressure valve opened completely to allow for lower flux during cleaning. After the permeate volume drained, the feed was also drained, and the system was rinsed using deionized water. After rinsing out the system, 35 L of new feed solution were added from the reserve feed tank.

Figure 10:
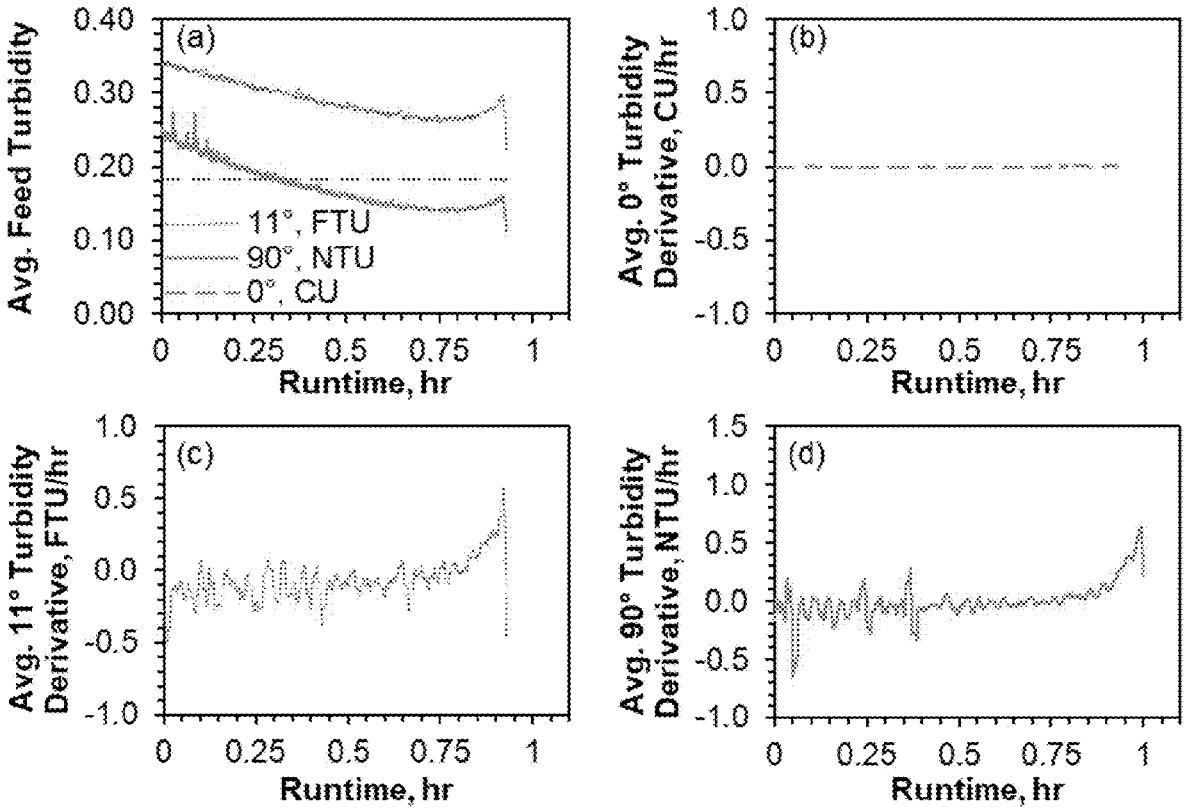
FIG. 10 shows results of bench-scale test of a calcium carbonate solution: Panel a: Feed turbidity over runtime (%) for the first cycle of the 0° degree turbidity signal (green line), and the 11° over 0° (blue trace) and 90° over 0° (orange trace) LR turbidity signal; Panel b: Turbidity derivative over runtime (%) for the first cycle of the 0° degree turbidity signal (HR); Panel c: Turbidity derivative over runtime (%) for the first cycle of the 11° over 0° degree turbidity ratio; Panel d: Turbidity derivative over runtime (%) for the first cycle of the 90° over 0° degree turbidity ratio.

As shown in FIG. 10 Panel a, a significant drop in both the 11° (blue trace) and 90° (orange trace) LR turbidity occurred over time. Therefore, as with gypsum, these signals were not suitable setpoint triggers, while both the 11° (Panel c) and 90° (Panel d) LR turbidity derivatives were more suitable. The turbidity signal for the calcium carbonate solution was not as clear as with gypsum. This was likely because calcium carbonate forms smaller crystals at lower concentrations that do not affect turbidity as strongly as calcium sulfate.

Figure 11:
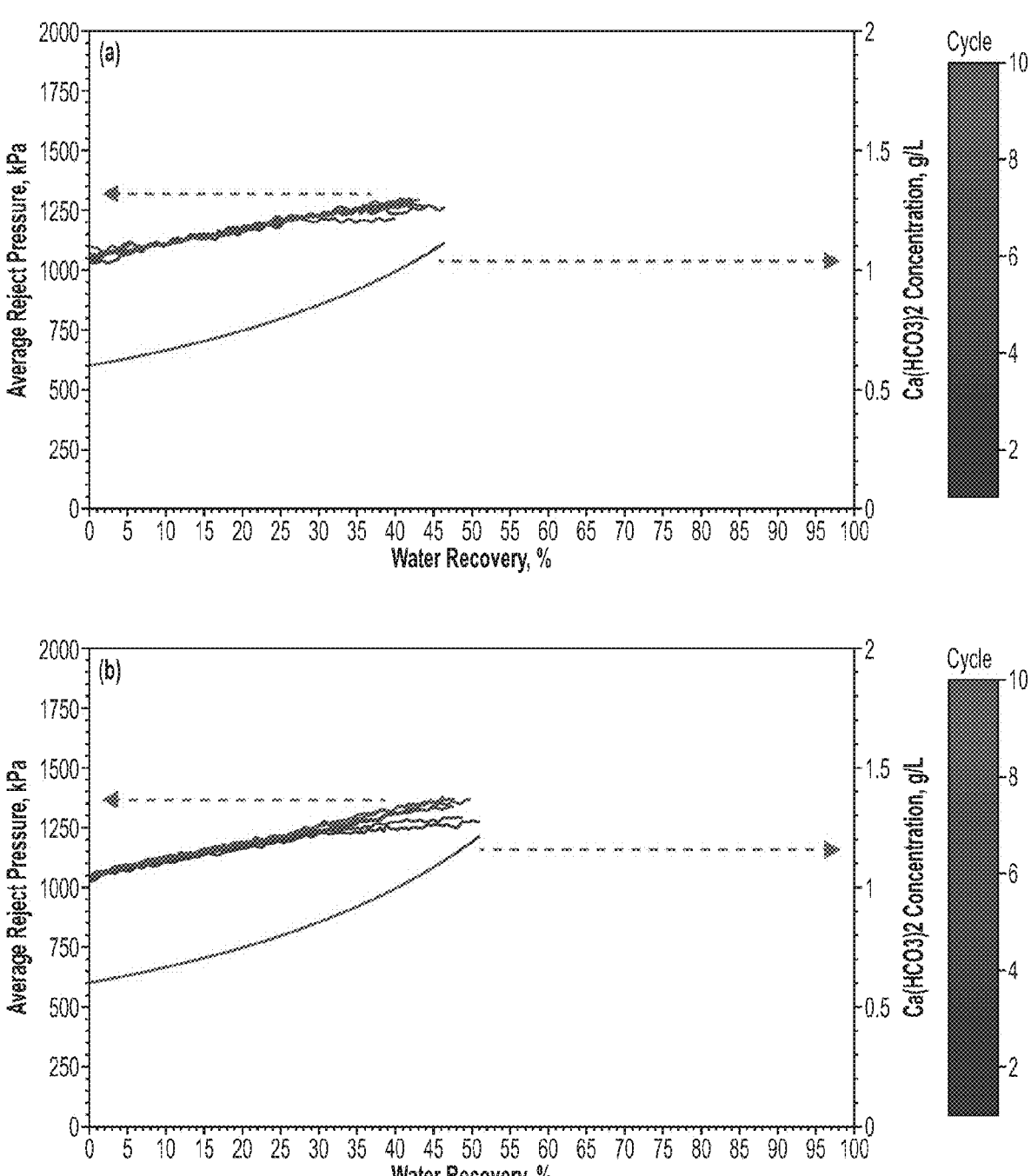
FIG. 11 shows graphs showing the evolution of average reject pressure over 10 concentration cycles and solute concentration using a setpoint based on the 11° turbidity derivative for a calcium carbonate solution using 11° (Panel a) and 90° (Panel b) turbidity derivative setpoints.

FIG. 11 shows the evolution of reject pressure for 10 concentration cycles using 11° (panel a) and 90° (panel b)

turbidity derivative setpoints. No scaling took place, as indicated by the minimum reject pressure being similar in all 10 cycles. The 11° setpoint cycles reached 0.9-1.05 g/L $Ca(HCO_3)_2$ (~2× saturation).

6.1.3 Silica

Figure 12:
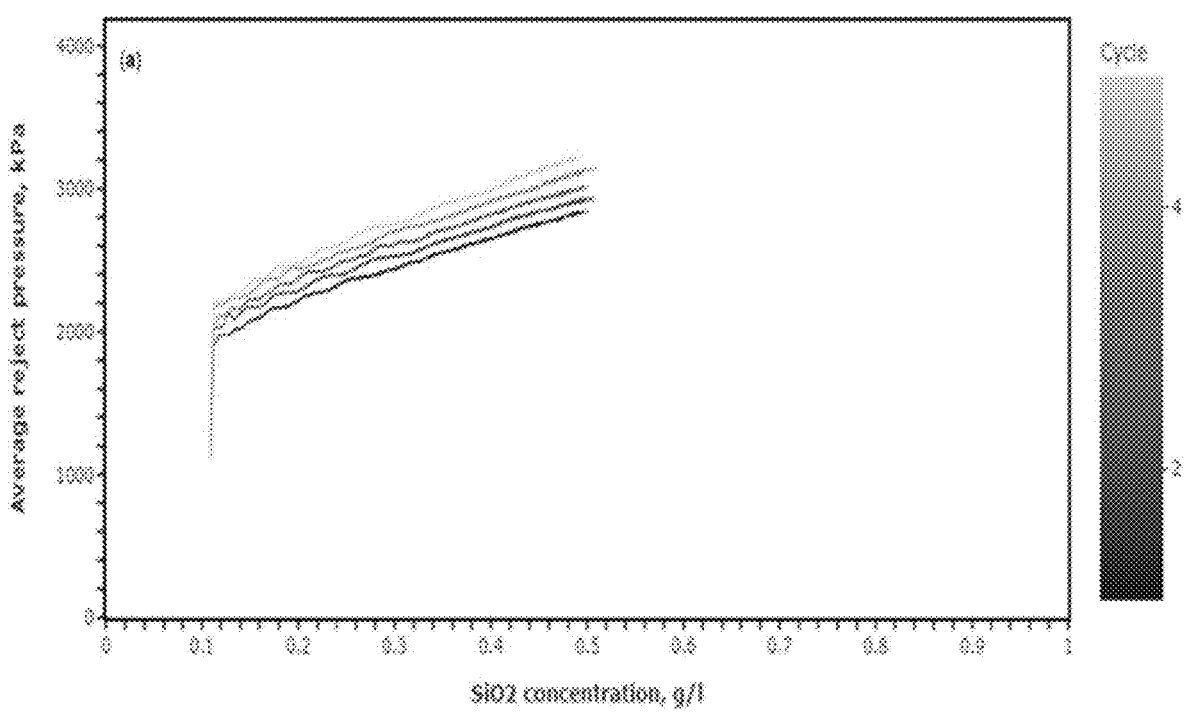
FIG. 12 shows results of for bench scale system tests of a silica solution: reject pressure as a function of concentration for all 5 cycles (Panel a); and (Panel b) feed turbidity and turbidity derivative over runtime (%) for the first cycle of the 11° over 0° degree turbidity ratio (LR).
Figure 12:
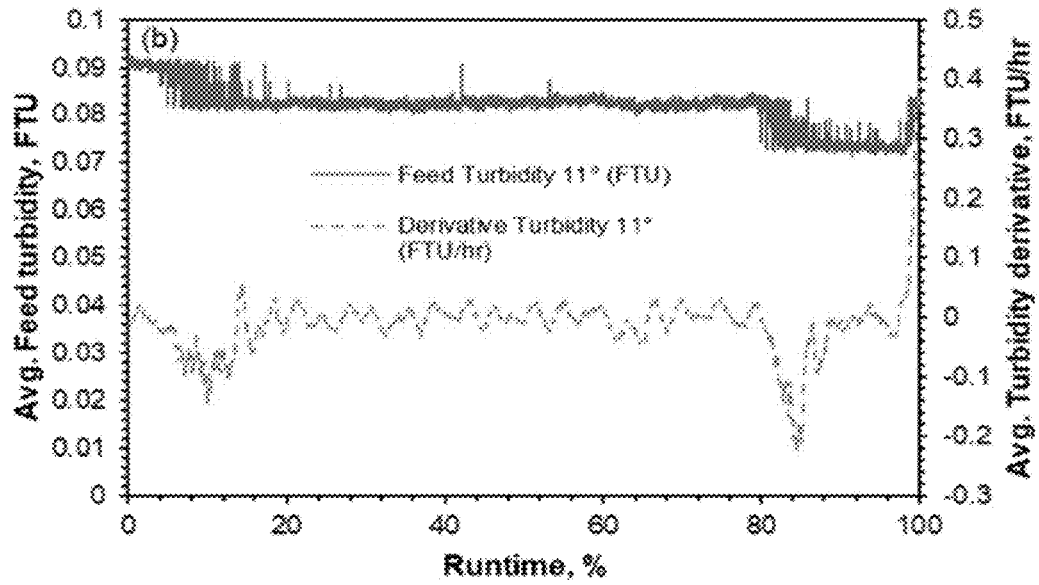

As with gypsum and calcium carbonate, the 11° turbidity value (FIG. 12 panel b, blue trace) was not suitable as a setpoint trigger, in contrast to the turbidity derivative (panel b, orange trace). Concentrations of 0.5 g/L $SiO_2$ (5× saturation) were achieved using the 11° turbidity derivative setpoint. The development of the reject pressure over the course of the cycle increased by 80 kPa (11.6 psi) or 4% per cycle over 5 cycles (FIG. 12 panel a).

Figure 13:
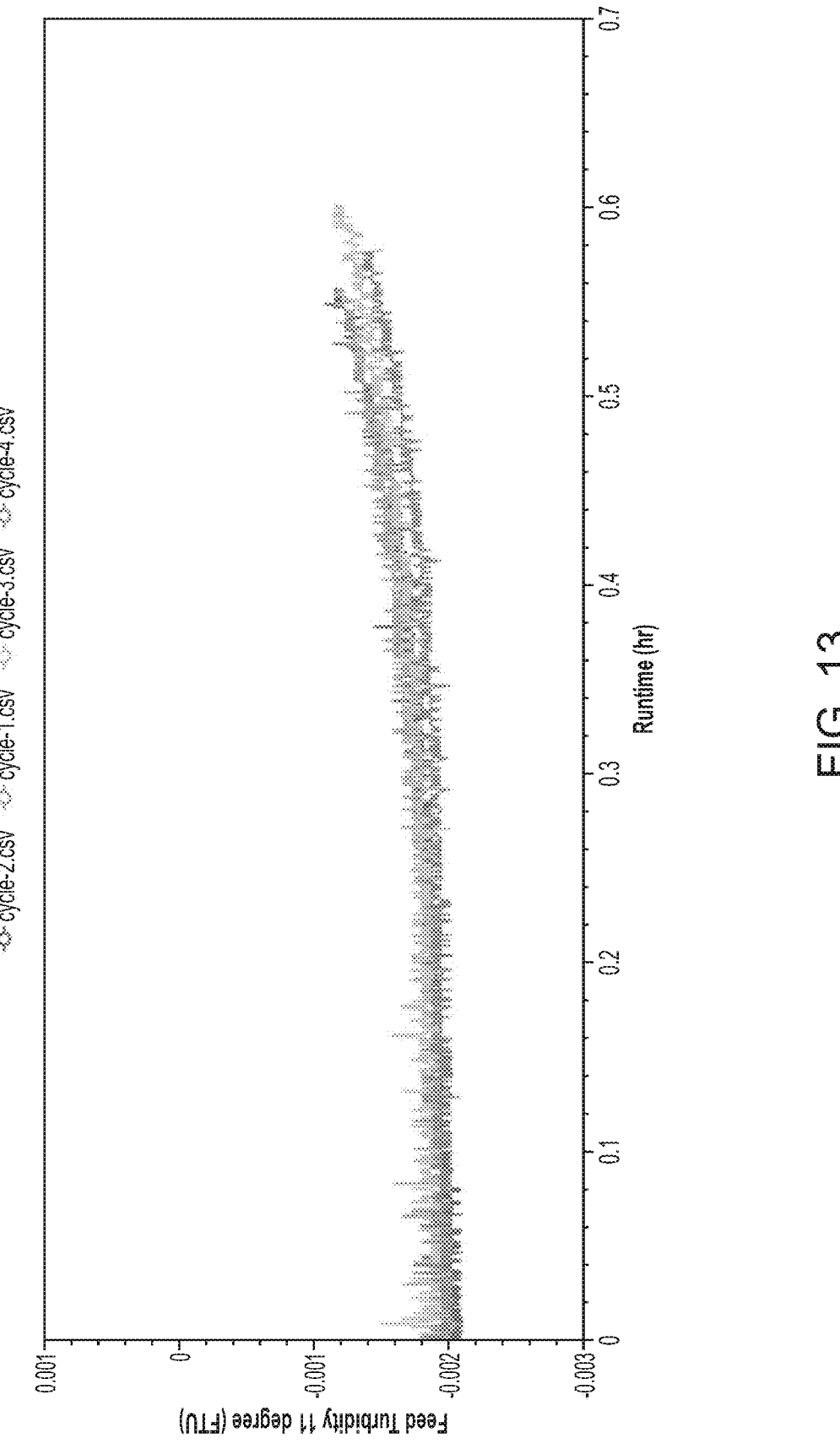
FIG. 13 shows the evolution of turbidity as a function of time over several concentration cycles for bench scale tests of a silica solution in which turbidity was measured with an optical turbidity monitor using emitted light with a lower wavelength.
Figure 14:
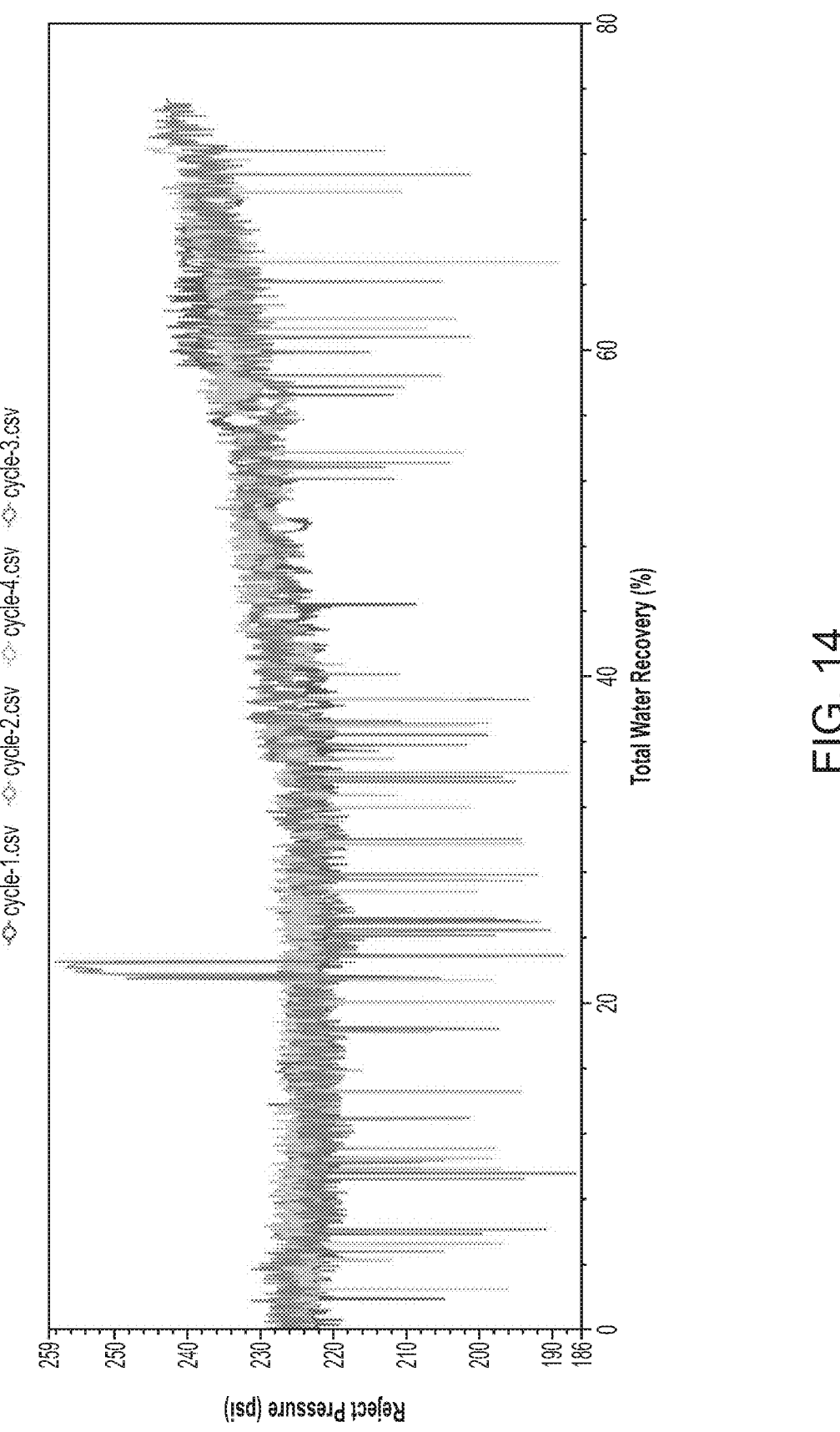
FIG. 14 shows the evolution of pressure as a function of time for the same bench scale tests of a silica solution.

Another silica solution test was performed in which turbidity was measured with an optical turbidity monitor using emitted light with a different wavelength. FIG. 13 and FIG. 14 show the evolution of turbidity and pressure, respectively, as a function of time for the silica solution over several concentration cycles. No pressure increase was observed over 4 cycles, and 75% water recovery or 0.4 g/L $SiO_2$ (4× saturation) was achieved.

6.2 Brackish Water Solutions Matching Real Agricultural Runoff Waters

A synthetic solution based on agricultural runoff water treated by a desalination facility in Yuma, Ariz. (YF) was tested both with and without SHMP antiscalant using the spiral wound RO. The pH of the solution was adjusted to 5.5-6.0 using a hydrochloric acid solution.

Figure 15:
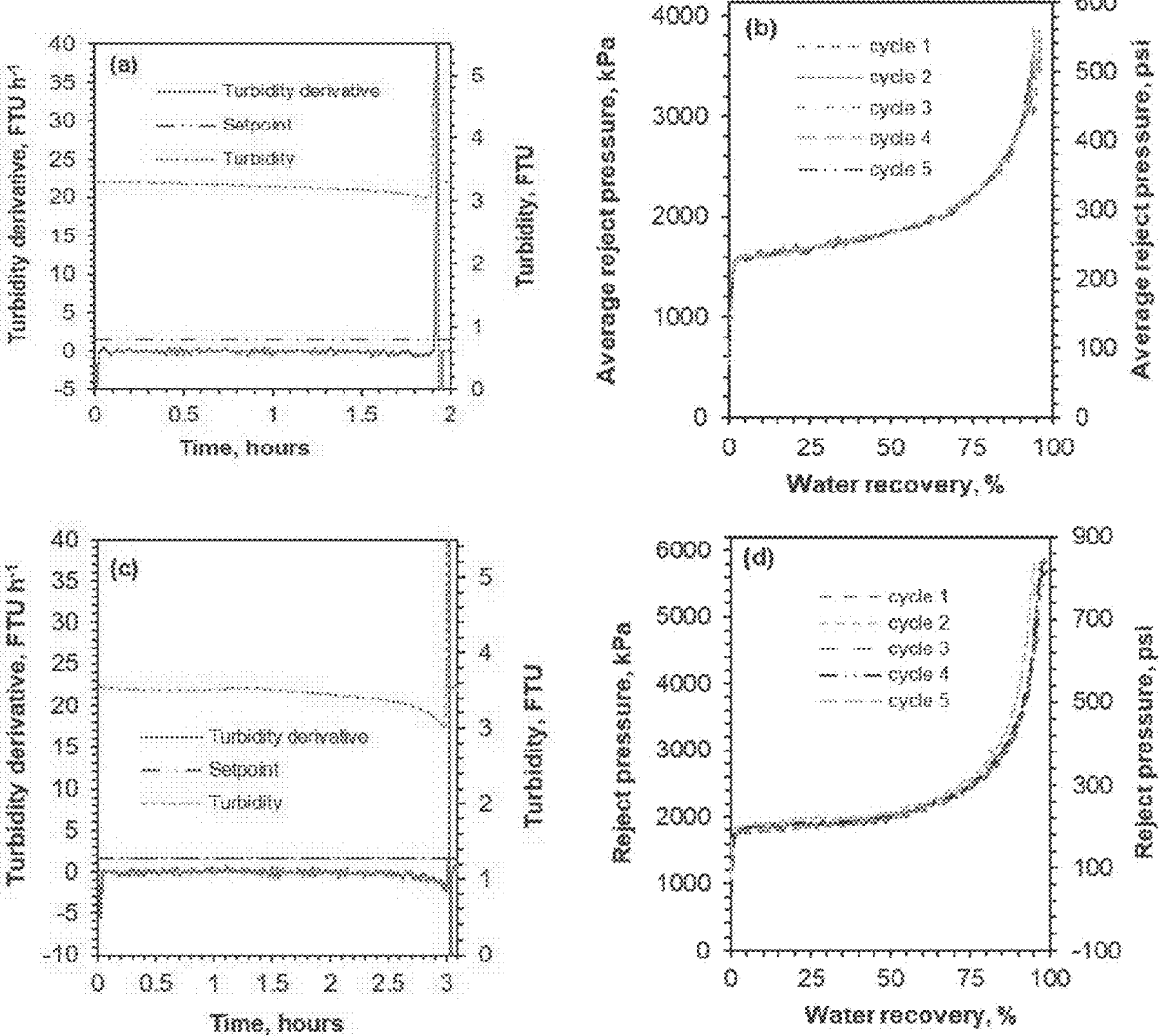
FIG. 15 shows feed turbidity and turbidity derivative over time for the first cycle (Panel a and Panel c) and reject pressure as a function of water recovery (Panel b and Panel d) for all cycles for bench scale system tests using YF solution without sodium hexametaphosphate (SHMP) antiscalant (Panel a and Panel b) and with SHMP antiscalant (Panel c and Panel d) using an RO spiral membrane (8,129 cm$^2$) with a flux of 20 L m$^{-2}$ hr$^{-1}$ and a cross flow 0.02 m s$^{-1}$ at 20° C.

In the beginning the absolute turbidity and turbidity derivative fluctuated due to bubbles formed when starting the system, but quickly stabilized for most of the first cycles (without and with SHMP in FIG. 15 Panel a and Panel c, respectively). Over the course of the cycle the turbidity decreased leading to a slight decrease in the turbidity derivative over time. The fluctuations at the end of the first cycles were caused by the permeate tank draining, the pressure valve opening, the system being cleaned, and the feed replaced.

The minimum reject pressure and the maximum reject pressure in all cycles were very similar FIG. 15 panels b, d). YF without SHMP (FIG. 15 panel b) started with a minimum reject pressure of 1,550 kPa (224.81 psi) and reached a maximum reject pressure of 3,750 kPa (543.89 psi). The "tail" at the beginning is due to the pressure valve adjusting the flux back to 20 L m$^{-2}$ hr$^{-1}$. The minimum reject pressure increased slightly in each cycle from 1,550 kPa (224.81 psi) to 1,600 kPa (232.06 psi) in the fifth cycle. However, integrity tests did not show an increase in pressure, indicating that scaling did not occur.

YF with SHMP started with a minimum reject pressure of around 1,750 kPa (253.82 psi) in the first cycle and increased slightly in each cycle (FIG. 15 Panel d). By the fifth cycle it increased to 1,850 kPa (268.32 psi). The system achieved a water recovery of 94% with YF without SHMP, whereas the OLI analysis of the solution projected a maximum water recovery of 85% before scaling would occur. This is most likely due to the calcium sulfate crystals forming homogenously and not immediately causing scaling. With the addition of SHMP, the system achieved a water recovery of around 98% with the recovery dropping slightly in each cycle. In cycle 5, the water recovery reached ~95%. However, the integrity tests revealed light scaling with this experiment with the pressure increasing by ~225 kPa (32.63 psi).

A solution based on agricultural runoff water treated by a desalination facility in San Luis Obispo, Calif. was tested (SLF) using a procedure similar to that of the YF solution.

Figure 16:
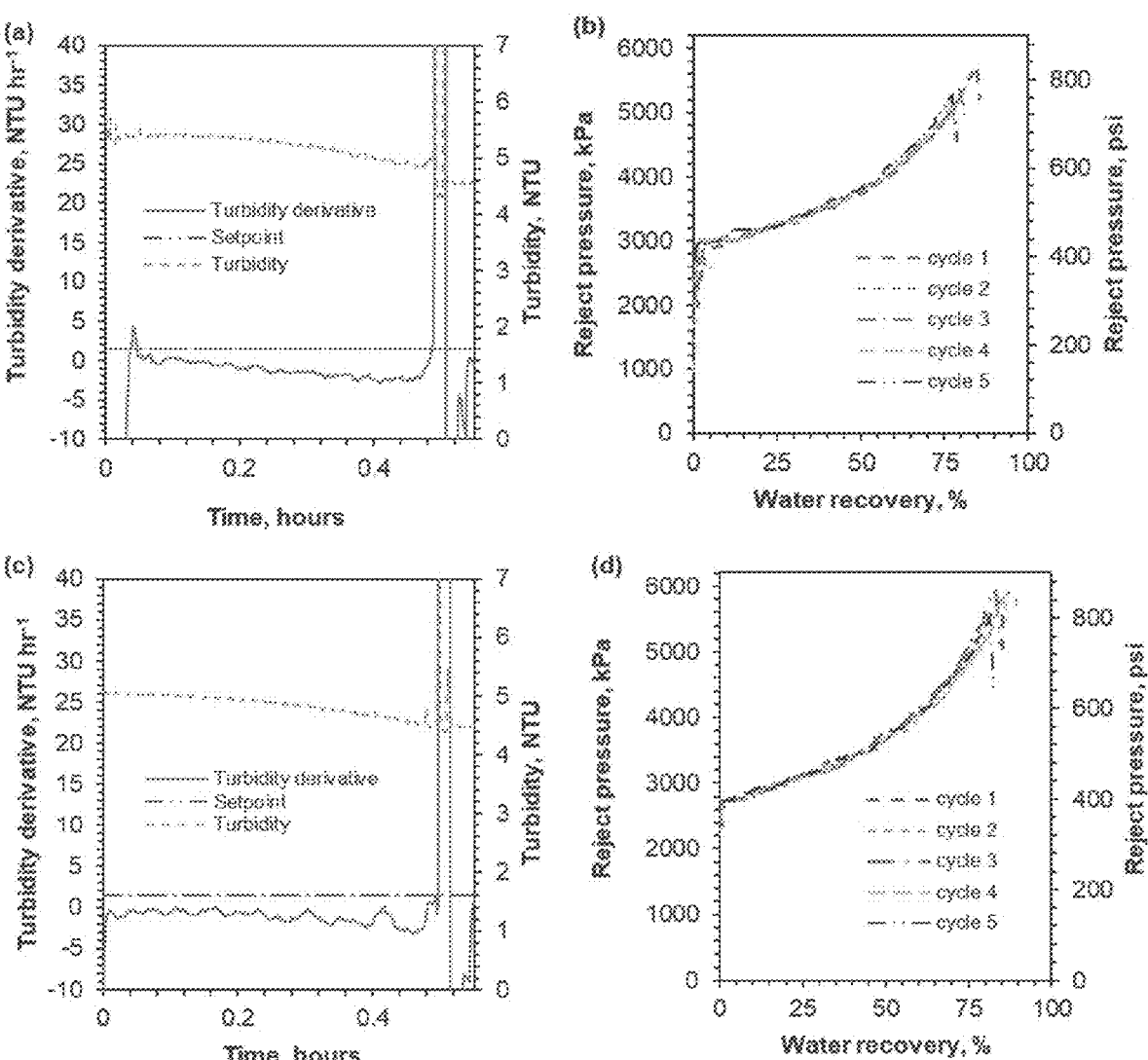
FIG. 16 shows feed turbidity and turbidity derivative over time for the first cycle (Panel a and Panel c) and reject pressure as a function of water recovery (Panel b and Panel d) for all cycles for bench scale system tests using SLF solution without Vitec 7400 antiscalant (Panel a and Panel b) and with Vitec 7400 antiscalant (Panels c and Panel d) using an RO spiral membrane (8,129 cm$^2$) with a flux of 20 L m$^{-2}$ hr$^{-1}$ and a cross flow 0.02 m s$^{-1}$ at 20° C.

Five consecutive cycles of SLF without and with Vitec 7400 antiscalant were performed with a total feed volume of 10 L. Results without scalant (Panel a and Panel b) and with scalant (Panel c and Panel d) are shown in FIG. 16). In each case, the absolute turbidity slightly decreased over most of the first cycle before stabilizing just before an exponential increase in absolute turbidity led to an exponential increase in the derivative that reached a pre-determined setpoint of 1.5 FTU hr$^{-1}$. In each case, the absolute turbidity slightly decreased over most of the first cycle before stabilizing just before an exponential increase in absolute turbidity led to an exponential increase in the derivative that reached the setpoint (FIG. 16 Panel a and Panel c).

For five cycles the system achieved a water recovery of ~80% without antiscalant (FIG. 16 Panel b). The highest water recovery was achieved in the first cycle with 84%. After that water recovery drops down to around 78% and stabilizes. Minimum reject pressure was around 3,000 kPa (435.11 psi). Only in the first cycle minimum reject pressure was 2,900 kPa (420.61 psi), indicating minimal scaling occurred during the first cycle. The results of the IT's indicate minimal scaling, requiring an increase of 75 kPa (10.88 psi) to maintain similar water flux as a new membrane.

The results of SLF with Vitec 7400 show a similar development (FIG. 16 Panel d). The minimum reject pressure started at ~1,720 kPa (249.46 psi) and stayed stable in each cycle. The water recovery achieved by the system with SLF with Vitec 7400 reached a water recovery of ~84%. The highest recovery was reached by the second cycle with 89% and the lowest was achieved by the fifth cycle with ~83%. The IT's revealed an increase in pressure due to scaling by 180 kPa (26.11 psi).

Figure 17:
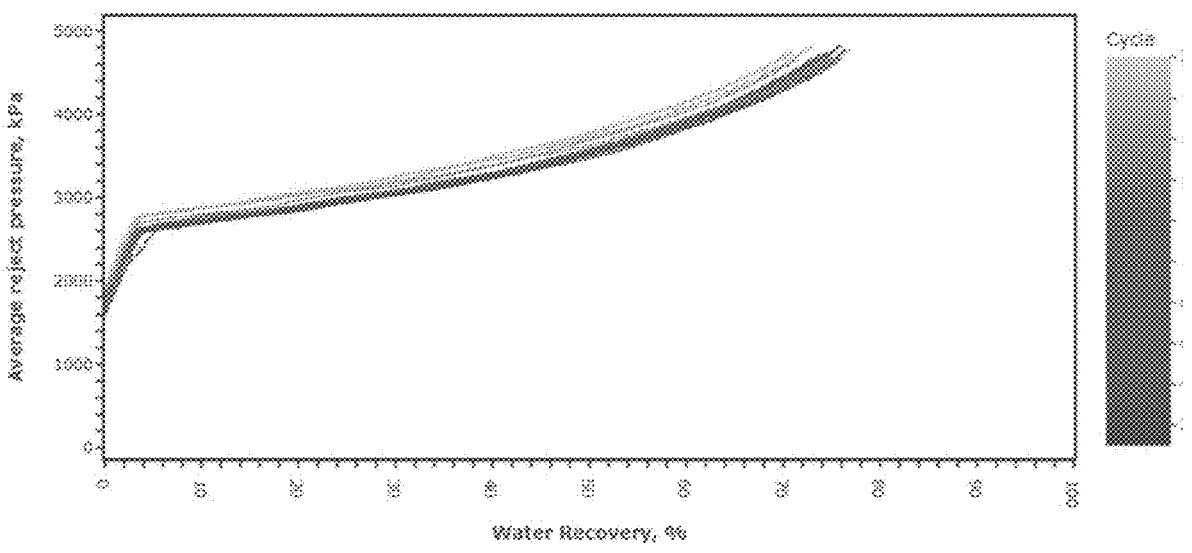
FIG. 17 shows reject pressure as a function of water recovery for 50 concentration cycles of the above SLF solution with an 11° automatic setpoint for a spiral wound RO membrane (8,129 cm$^2$) with a flux of 15 L/m$^2$/hr and a cross flow 0.03 m/sec at 20° C.
Figure 18:
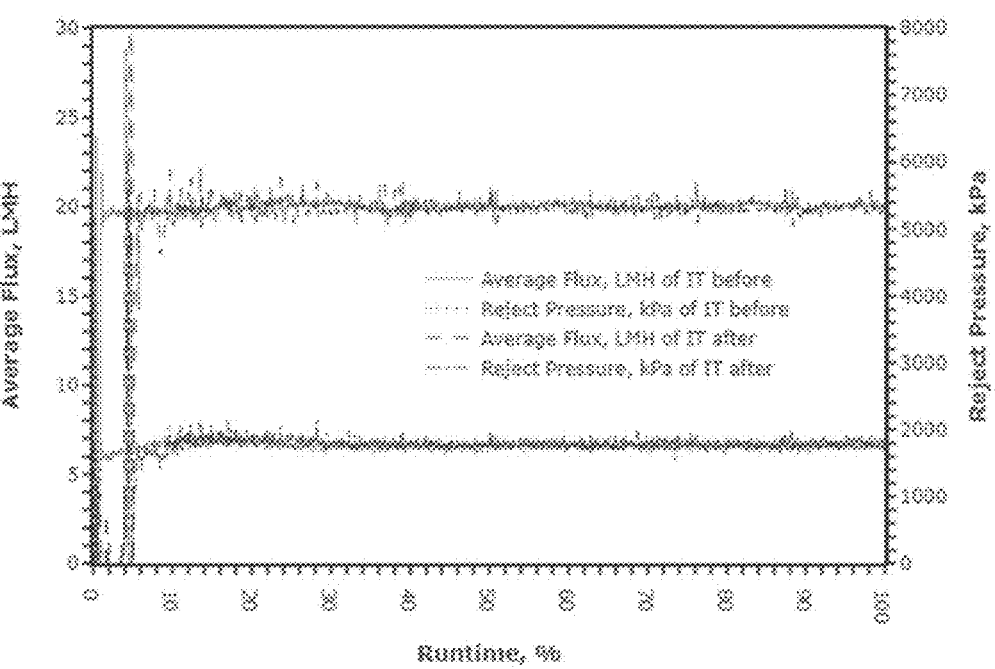
FIG. 18 shows the flux and reject pressure of the integrity test before and after the above-referenced SLF experiment.
Figure 19:
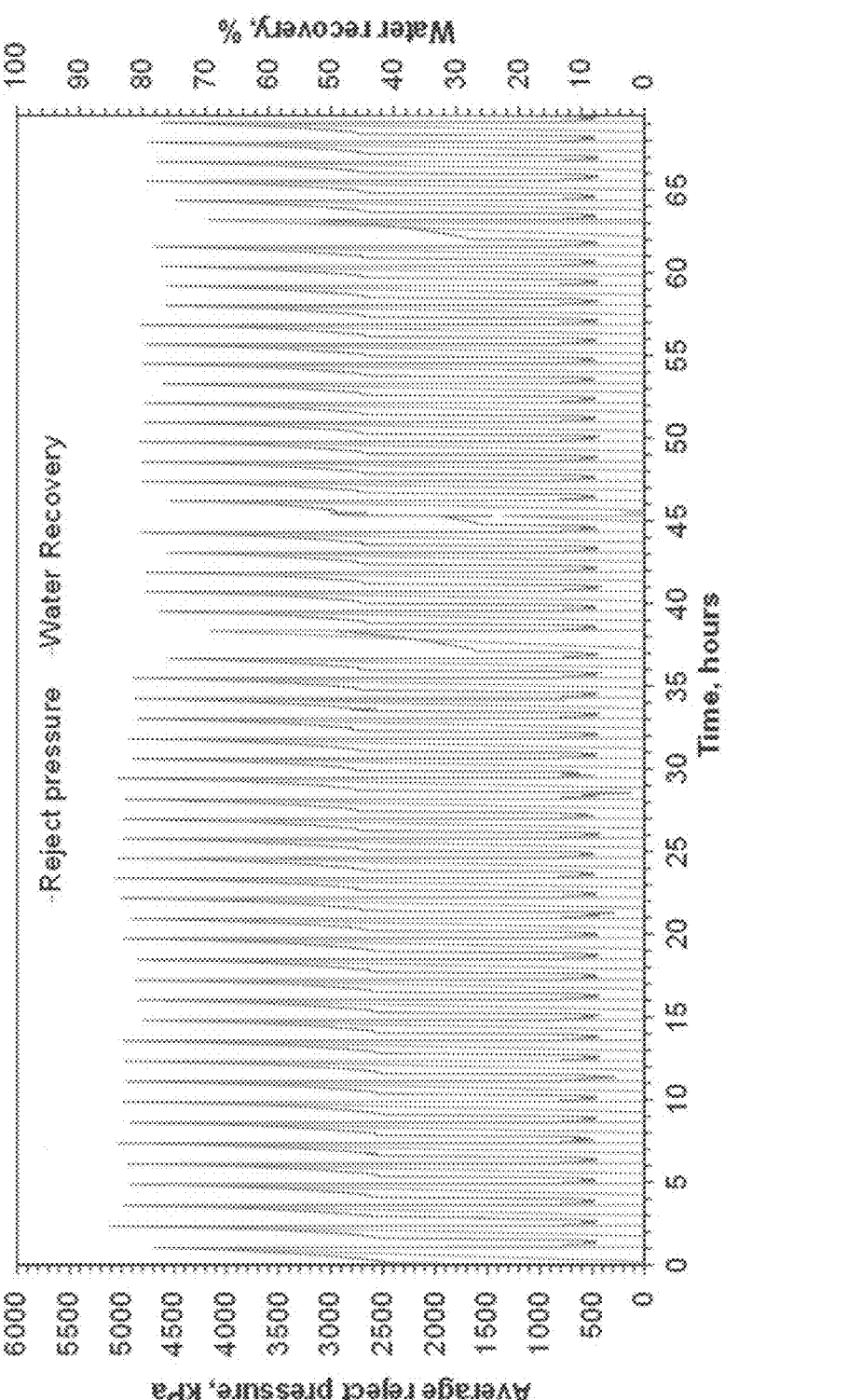
FIG. 19 shows reject pressure and water recovery over time for the 50 concentration cycles of the above-referenced SLF experiment.

A long-term test was performed with SFL solution over 50 concentration cycles without antiscalant, with an 11° automatic setpoint for a spiral wound RO membrane (8,129 cm$^2$) with a flux of 15 L/m$^2$/hr and a cross flow 0.03 m/sec at 20° C. As shown in FIG. 17, the system achieved 70% water recovery, showing performance equivalent to that seen at the San Luis Plant with the use of antiscalant. As shown in FIG. 19, no measurable pressure increase was observed after 50 cycles. This is also confirmed by the results from the integrity test in FIG. 18 that indicated no increase in pressure after 50 cycles.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

References to approximations are made throughout this specification, such as by use of the terms "substantially" and "about." For each such reference, it is to be understood that, in some embodiments, the value, feature, or characteristic may be specified without approximation. For example, where qualifiers such as "about" and "substantially" are used, these terms include within their scope the qualified words in the absence of their qualifiers. All ranges also include both endpoints.

Similarly, in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description.

Without further elaboration, it is believed that one skilled in the art can use the preceding description to utilize the invention to its fullest extent. The claims and embodiments disclosed herein are to be construed as merely illustrative and exemplary, and not a limitation of the scope of the present disclosure in any way. It will be apparent to those having ordinary skill in the art, with the aid of the present disclosure, that changes may be made to the details of the above-described embodiments without departing from the underlying principles of the disclosure herein. In other words, various modifications and improvements of the embodiments specifically disclosed in the description above are within the scope of the appended claims. Moreover, the order of the steps or actions of the methods disclosed herein may be changed by those skilled in the art without departing from the scope of the present disclosure. In other words, unless a specific order of steps or actions is required for proper operation of the embodiment, the order or use of specific steps or actions may be modified. The scope of the invention is therefore defined by the following claims and their equivalents.

What is claimed is:

1. A method of detecting scaling during processing of a liquid solution, comprising:
  providing a separation system comprising:
    a separation module comprising a separating element that separates one or more solutes from a liquid solution and concentrates the one or more solutes into a concentrate stream;
    an optical turbidity monitor comprising an optical signal source and at least one optical sensor;
  supplying a feed stream of the liquid solution to the separation module at a pressure and a flow rate;
  measuring turbidity of the concentrate stream using the optical turbidity monitor to determine a turbidity value of the concentrate stream;
  calculating a first derivative of the turbidity value with respect to time to generate a turbidity derivative;
  determining a setpoint that corresponds to a concentration of a scalant mineral in the feed stream below which scaling of the separating element by the scalant mineral does not occur;
  comparing the turbidity derivative to the setpoint; and
  performing a preventative measure to avoid further scaling by the scalant mineral if the turbidity derivative equals or exceeds the setpoint.

2. The method of claim 1, further comprising applying signal conditioning to reduce noise in the turbidity value, wherein the signal conditioning comprises filtering using a coherence function between two or more turbidity signals produced by the optical turbidity monitor.

3. The method of claim 1, wherein determining the setpoint comprises calculating a signal-to-noise ratio (SNR) of the turbidity derivative.

4. The method of claim 3, wherein the setpoint is determined to be a multiple of the SNR, and wherein the multiple is about 3 to about 10.

5. The method of claim 3, wherein calculating the SNR comprises:
  calculating a moving average of the turbidity derivative over a time interval, wherein the time interval is about 10 seconds to about 1000 seconds;
  calculating a standard deviation of the turbidity derivative over the time interval; and
  calculating the SNR as:

$$SNR = \frac{s - \mu}{\sigma}$$

where s is the turbidity derivative, μ is the moving average of the turbidity derivative, and σ is the standard deviation of the turbidity derivative.

6. The method of claim 1, wherein the optical turbidity monitor includes:
  a first optical sensor positioned at an angle of about 0° relative to the path of light emitted from the optical signal source and configured to produce a transmittance measurement; and
  a second optical sensor positioned at about 10° to about 90° relative to the path of light emitted from the optical signal source and configured to produce a scattering measurement,
  wherein the turbidity value is a ratio of the scattering measurement to the transmittance measurement.

7. The method of claim 1, wherein the separating element comprises a membrane configured for forward osmosis, reverse osmosis, microfiltration, nanofiltration, ultrafiltration, membrane distillation or electrodialysis.

8. The method of claim 1, further comprising:
  recycling the concentrate stream through the separation module if the turbidity derivative is below the setpoint; and
  diverting the concentrate stream away from the separation module if the turbidity derivative equals or exceeds the setpoint.

9. The method of claim 1, further comprising determining an improved subsequent setpoint based upon iterative results of one or more of: measuring a pressure of the concentrate stream, analyzing the turbidity value of the concentrate stream, and assessing effectiveness of the preventative measure,
  wherein the preventative measure comprises at least one of: flushing with undersaturated solution, osmotic backflushing, flow reversal, chemical cleaning, adding an antiscalant to the feed stream, and adjusting a pH of the feed stream.

10. The method of claim 1, wherein the optical signal source generates light at a wavelength of about 250 nm to about 10000 nm, about 250 nm to about 1400 nm, about 350 nm to about 1000, about 350 nm to about 500 nm, or about 800 nm to about 1000 nm.

11. A method of detecting scaling during processing of a liquid solution, comprising:
  providing a separation system comprising:
    at least one separation module comprising a separating element that separates one or more solutes from a liquid solution and concentrates the one or more solutes into a concentrate stream;
    an optical turbidity monitor comprising an optical signal source and at least one optical sensor;
  supplying a feed stream of the liquid solution to the at least one separation module;

measuring turbidity of the concentrate stream using the optical turbidity monitor to determine a turbidity value of the concentrate stream;

calculating a first derivative of the turbidity value with respect to time to generate a turbidity derivative;

determining a setpoint that corresponds to a concentration of a scalant mineral in the feed stream below which scaling of the separating element by the scalant mineral does not occur; and comparing the turbidity derivative to the setpoint.

12. The method of claim 11, wherein determining the setpoint comprises calculating a signal-to-noise ratio (SNR) of the turbidity derivative.

13. The method of claim 12, wherein the setpoint is determined to be a multiple of the SNR, and wherein the multiple is about 3 to about 10.

14. The method of claim 12, wherein calculating the SNR comprises:

calculating a moving average of the turbidity derivative over a time interval, wherein the time interval is about 10 seconds to about 1000 seconds;

calculating a standard deviation of the turbidity derivative over the time interval; and calculating the SNR as:

$$SNR = \frac{s - \mu}{\sigma}$$

where s is the turbidity derivative, $\mu$ is the moving average of the turbidity derivative, and $\sigma$ is the standard deviation of the turbidity, and wherein the scalant mineral is selected from gypsum, calcium carbonate, silica, calcium phosphate, strontium sulfate, barium sulfate, and ammonium nitrate.

15. The method of claim 11, further comprising determining an improved subsequent setpoint based upon iterative results of one or more of: measuring a pressure of the concentrate stream, analyzing the turbidity value of the concentrate stream, and assessing effectiveness of the preventative measure, wherein the preventative measure comprises at least one of: flushing with undersaturated solution, osmotic backflushing, flow reversal, chemical cleaning, adding an antiscalant to the feed stream, and adjusting a pH of the feed stream.

\* \* \* \* \*